（12） United States Patent
Kaethner et al.

(10) Patent No.: US 11,436,767 B2
(45) Date of Patent: Sep. 6, 2022

(54) PROVIDING A CONSTRAINT IMAGE DATA RECORD AND/OR A DIFFERENCE IMAGE DATA RECORD

(71) Applicant: Siemens Healthcare GmbH, Erlangen (DE)

(72) Inventors: Christian Kaethner, Forchheim (DE); Markus Kowarschik, Nuremberg (DE); Michael Manhart, Fuerth (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 20 days.

(21) Appl. No.: 16/736,009

(22) Filed: Jan. 7, 2020

(65) Prior Publication Data
US 2020/0226802 A1 Jul. 16, 2020

(30) Foreign Application Priority Data
Jan. 11, 2019 (DE) .......................... 102019200269.2

(51) Int. Cl.
*G06T 11/00* (2006.01)
*G06T 7/00* (2017.01)

(52) U.S. Cl.
CPC .......... *G06T 11/008* (2013.01); *G06T 7/0012* (2013.01); *G06T 2207/10116* (2013.01);
(Continued)

(58) Field of Classification Search
None
See application file for complete search history.

(56) References Cited

U.S. PATENT DOCUMENTS 7,330,532 B2 * 2/2008 Winsor ................. A61B 6/482
250/367
2006/0198491 A1 9/2006 Taguchi
(Continued)

FOREIGN PATENT DOCUMENTS

CN 107847209 A * 3/2018 .......... A61B 6/5294
CN 108022272 A * 5/2018
(Continued)

OTHER PUBLICATIONS

Machine translation of CN-107847209-A (Year: 2018).*
Machine translation of CN-108022272-A (Year: 2018).*
Ronneberger, Olaf et al. "U-Net: Convolutional Networks for Biomedical Image Segmentation" Medical Image Computing and Computer-Assisted Intervention (MICCAI), Springer, LNCS, vol. 9351, pp. 234-241, 2015 // arXiv:1505.04597 [cs.CV.
(Continued)

*Primary Examiner* — Vu Le
*Assistant Examiner* — Courtney Joan Nelson
(74) *Attorney, Agent, or Firm* — Harness, Dickey & Pierce, P.L.C.

(57) ABSTRACT

A computer-implemented method includes, in an embodiment, receiving first X-ray projections of an examination volume in respect of a first X-ray energy and second X-ray projections in respect of a second X-ray energy, the first and second X-ray energies differing. The method further includes determination of a multienergetic real image data record of the examination volume based upon the first and second X-ray projections; selection of first voxels of the multienergetic real image data record based upon the multienergetic real image data record; selection of second voxels of the multienergetic real image data record based upon the first X-ray projections and the second X-ray projections, the first voxels including the second voxels and the second voxels mapping contrast medium in the examination volume. The method further includes provision of a constraint image data record and/or a difference image data record based upon the second voxels.

25 Claims, 10 Drawing Sheets

(52) U.S. Cl.
CPC ............... *G06T 2207/20081* (2013.01); *G06T 2211/408* (2013.01); *G06T 2211/416* (2013.01); *G06T 2211/421* (2013.01)

(56) References Cited

U.S. PATENT DOCUMENTS

| | | | | |
|---|---|---|---|---|
| 2013/0046176 A1* | 2/2013 | Mistretta | ............... | A61B 6/4441 600/431 |
| 2017/0123083 A1 | 5/2017 | Divoky | | |
| 2018/0204357 A1* | 7/2018 | Li | .................. | G06T 11/005 |
| 2018/0374209 A1* | 12/2018 | Patil | ................ | G06T 7/11 |
| 2020/0013153 A1 | 1/2020 | Kaethner et al. | | |
| 2020/0226801 A1 | 7/2020 | Kaethner et al. | | |

FOREIGN PATENT DOCUMENTS

| | | |
|---|---|---|
| DE | 102019200270 A1 | 7/2020 |
| EP | 3591617 A1 | 1/2020 |
| WO | WO-2019149711 | 8/2019 |

OTHER PUBLICATIONS

Chen, Guang-Hong et al. "Prior image constrained compressed sensing (PICCS): A method to accurately reconstruct dynamic CT images from highly undersampled projection data sets" Medical Physics, vol. 35, No. 2, pp. 660-663, ISSN: 0094-2405, Feb. 2008 // DOI: 10.1118/1.2836423.

A. Elbakri et al: "Statistical image reconstruction for polyenergetic X-ray computed tomography", IEEE Transactions on Medical Imaging, vol. 21, Nr. 2, pp. 89-99, 2002.

J.C. Montoya et al.: "3D Deep Learning Angiography (3D-DLA) from C-arm Conebeam CT", Original Research Interventional, AJNR, 2018.

F. Bleichrodt et al.: "SDART: An algorithm for discrete tomography from noisy projections", Computer Vision and Image Understanding 129, pp. 63-74, 2014.

German Office Action for German Application No. DE 102019200269.2 dated Nov. 5, 2019.

Office Action for U.S. Appl. No. 16/736,058 dated Mar. 31, 2022.

* cited by examiner

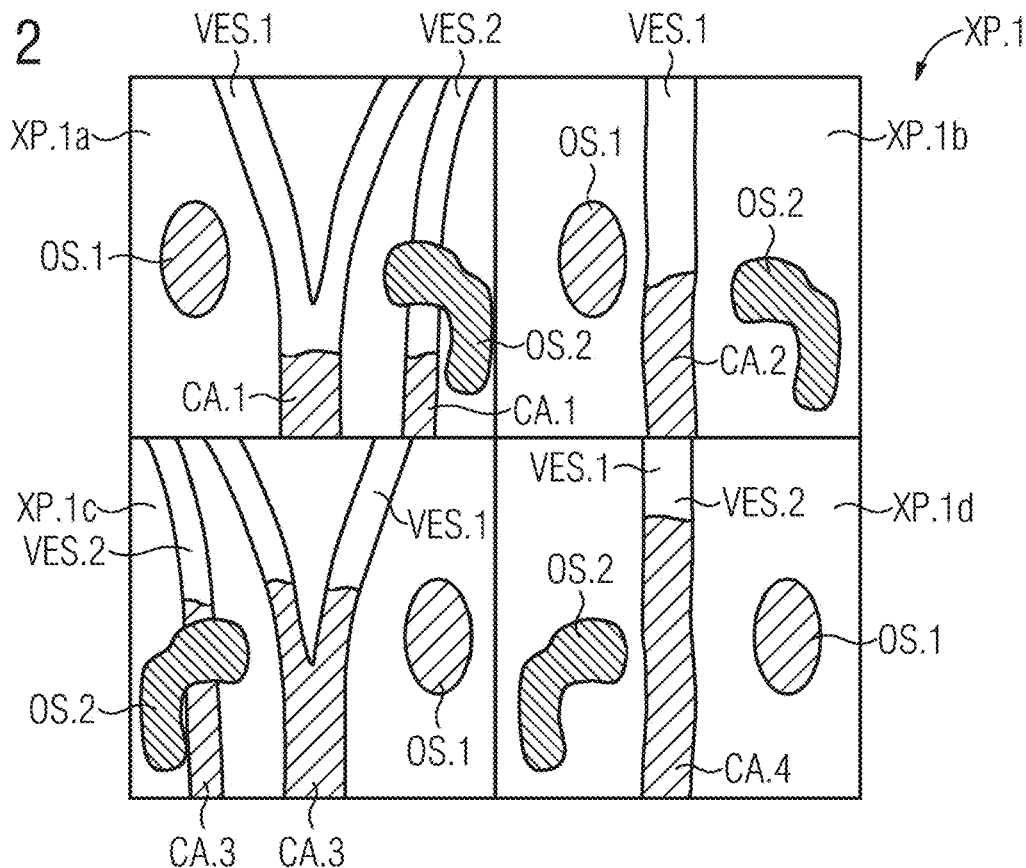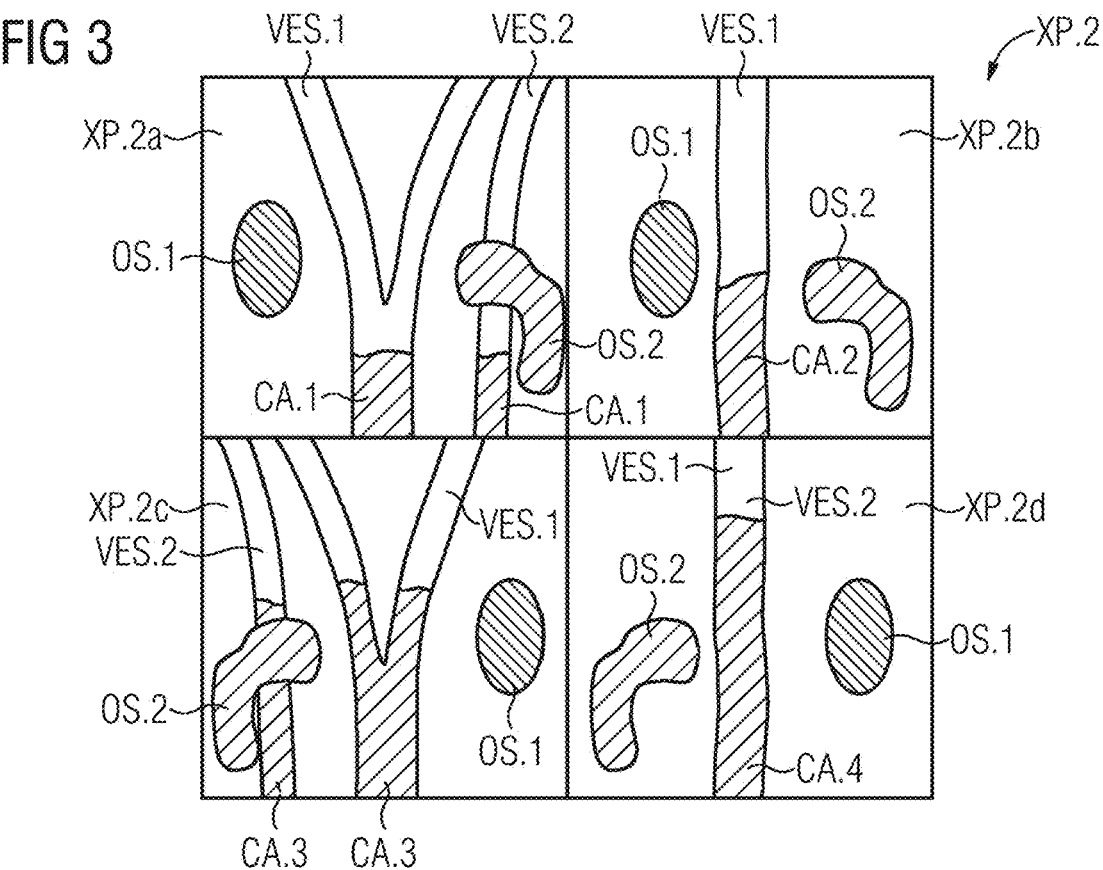

PROVIDING A CONSTRAINT IMAGE DATA RECORD AND/OR A DIFFERENCE IMAGE DATA RECORD

PRIORITY STATEMENT

The present application hereby claims priority under 35 U.S.C. § 119 to German patent application number DE 102019200269.2 filed Jan. 11, 2019, the entire contents of which are hereby fully incorporated herein by reference.

FIELD

Embodiments of the invention generally relate to a computer-implemented method for training or for providing a constraint image data record and/or a difference image data record; and or a similar system.

BACKGROUND

In digital subtraction angiography (DSA for short), one or more vessels are represented in an examination volume by way of X-ray recordings, wherein for the suppression of further structures in the examination volume, recordings of the vessel without contrast medium (so-called mask recordings) are combined with recordings of the vessel including a contrast medium which is situated in the vessel. The contrast medium is introduced into the vessel during the examination in order to determine parameters, in particular, hydrodynamic parameters of a fluid which flows in the vessel.

In four-dimensional DSA, by way of an image reconstruction method, a time-resolved series of three-dimensional DSA image data is provided. Herein, normalized two-dimensional X-ray projections of an examination volume are back-projected together with time information into a volume element. The two-dimensional X-ray projections usually originate herein from a rotating scan protocol of a C-arm X-ray device.

Since for a digital subtraction angiography, recordings both of the vessel without contrast medium and also of the vessel including a contrast medium are made, the examination volume is exposed to a high X-ray burden. The recordings of the vessel without contrast medium are known as "mask images".

Hereinafter, an image data record can be denoted a "real image data record" if it reproduces the actual distribution of values and/or intensities (e.g. Hounsfield units, X-ray attenuation coefficients) in an examination volume. An image data record can be denoted a "difference image data record" if it reproduces a difference of an actual distribution of values and/or intensities in an examination volume. However, a difference image data record is not necessarily determined through subtraction of two real image data records. An image data record can be designated a subtraction image data record if it has been determined by subtraction of two image data records, in particular by subtraction of two real image data records. Therefore, in particular, every subtraction image data record could be regarded as a difference image data record, but not every difference image data record can be regarded as a subtraction image data record.

From the unpublished patent application EP18182251, it is known, by applying a trained function to a real image data record to determine a difference image data record without carrying out an additional mask recording.

SUMMARY

The inventors have discovered that, since for example, osseous structures, metal structures (e.g. implants) or calciferous structures (calcification in vessels) in the examination region have a similar X-ray absorption to contrast medium, such structures can lead in the examination region to errors in the determination of the difference image data record.

At least one embodiment of the present application is directed to achieving a more exact and less error-prone determination of the difference image data record.

Embodiments of the present application are directed to a method for preparing a constraint image data record and/or a difference image data record; a method for providing a trained function; a provision system; an X-ray device; a training system; and computer programs or computer-readable storage media. Advantageous developments are disclosed in the claims and in the description.

Inventive embodiments are described below, both in relation to the devices and also in relation to the method. Features, advantages or alternative embodiments mentioned herein are also transferable similarly to the other claimed subject matter and vice versa. In other words, the present claims (which are directed, for example, to a device) can also be further developed with the features disclosed or claimed in relation to a method. The corresponding functional features of the method are thereby provided by corresponding physical modules.

Furthermore, the inventive embodiments are described below, both in relation to methods and devices for providing constraint image data records and/or difference image data records as well as in relation to methods and devices for providing trained functions. Herein, features and alternative embodiments of data structures and/or functions in methods and devices for providing constraint image data records and/or difference image data records can be transferred to similar data structures and/or functions in methods and devices for providing trained functions. Herein, similar data structures can be characterized, in particular, by the use of the qualifier "training". Furthermore, the trained functions used in methods and devices for providing constraint image data records and/or difference image data records, can in particular have been adapted and/or provided by way of methods and devices for providing trained functions.

The application, in a first embodiment, is directed to a computer-implemented method for providing a constraint image data record and/or a difference image data record, comprising: receiving first X-ray projections of an examination volume in respect of a first X-ray energy;

receiving second X-ray projections of the examination volume in respect of a second X-ray energy, the second X-ray energy differing from the first X-ray energy;

determining a multienergetic real image data record of the examination volume based upon the first X-ray projections received and the second X-ray projections received;

selecting first voxels of the multienergetic real image data record, based upon the multienergetic real image data record determined;

selecting second voxels of the multienergetic real image data record, based upon the first X-ray projections received and the second X-ray projections received, the first voxels including the second voxels and the second voxels mapping contrast medium in the examination volume; and providing the at least one of the constraint image data record and the difference image data record based upon the second voxels selected.

According to a further embodiment of the application, a biplanar X-ray device comprises the first X-ray source, the second X-ray source, the first X-ray detector and the second X-ray detector. The inventors have identified that by the use of a biplanar X-ray device, the first X-ray source and the first X-ray detector can be better coordinated with the second X-ray source and the second X-ray detector. In particular, a registration of the first X-ray source and of the first X-ray detector in respect of the first X-ray source and the second X-ray detector can be dispensed with since the relative positions of the X-ray sources and the X-ray detectors in a biplanar X-ray device are known.

A further embodiment of the application relates to a method for providing a trained function comprising:

determining a multienergetic training real image data record of a training examination volume in respect of a first training X-ray energy and a second training X-ray energy, the second training X-ray energy differing from the first training X-ray energy;

determining a training constraint image data record of the training examination volume;

determining first training voxels of the multienergetic training real image data record determined by applying the trained function to the training real image data record;

adapting the trained function based upon a comparison of the first training voxels determined and the training constraint image data record determined; and providing the trained function adapted.

In a further embodiment, the application relates to a provision system for providing a constraint image data record and/or a difference image data record, comprising:

an interface, the interface being configured to receive first X-ray projections of an examination volume in respect of a first X-ray energy and being configured to receive second X-ray projections of the examination volume in respect of a second X-ray energy, the second X-ray energy differing from the first X-ray energy; and a computer unit, at least one of the interface and the computer unit being configured to determine a multienergetic real image data record of the examination volume based upon the first X-ray projections received and the second X-ray projections received, the computer unit being configured to select first voxels of the multienergetic real image data record based upon the multienergetic real image data record determined, and being configured to select second voxels of the multienergetic real image data record based upon the first X-ray projections received and the second X-ray projections received, the first voxels including the second voxels and the second voxels mapping contrast medium in the examination volume, and at least one of the interface and the computer unit being configured to provide at least one of the constraint image data record and the difference image data record based upon the second voxels selected.

The application relates in a fourth embodiment to an X-ray device comprising a provision system according to an embodiment of the invention. In particular, the X-ray device comprises a first X-ray source, a second X-ray source, a first X-ray detector and a second X-ray detector. In particular, the first X-ray source and the first X-ray detector are configured to rotate simultaneously around an examination volume. In particular, the second X-ray source and the second X-ray detector are configured to rotate simultaneously around the examination volume. The X-ray device is, in particular, a dual-source C-arm X-ray system or a dual-source computed tomography device.

In a fifth embodiment, the application relates to a training system for providing a trained function comprising:

a training interface; and a training computer unit, at least one of the training interface and the training computer unit being configured to determine a multienergetic training real image data record of a training examination volume in respect of a first training X-ray energy and a second training X-ray energy, the second training X-ray energy differing from the first training X-ray energy, at least one of the training interface and the training computer unit being configured to determine a training constraint image data record of the training examination volume, the training computer unit being configured to determine first training voxels of the training real image data record by applying the trained function to the training real image data record, and being configured for adapting the trained function based upon a comparison of the first training voxels determined and the training constraint image data record determined, and the training interface being configured to provide the trained function.

The application relates, in a sixth embodiment, to a computer program product having a computer program which is directly loadable into a memory of a provision system, having program portions in order to carry out all the steps of an embodiment of the method for providing a constraint image data record and/or a difference image data record or its aspects when the program portions are executed by the provision system; and/or which is directly loadable into a training memory of a training system, having program portions in order to carry out all the steps of an embodiment of the method for providing a trained function or one of its aspects when the program portions are executed by the training system.

The application relates, in a possible seventh embodiment, to a computer program product having a computer program which is directly loadable into a memory of a provision system, having program portions in order to carry out all the steps of an embodiment of the method for providing a constraint image data record and/or a difference image data record or its aspects when the program portions are executed by the provision system.

The application relates, in a possible eighth embodiment, to a computer program product having a computer program which is directly loadable into a training memory of a training system, having program portions in order to carry out all the steps of an embodiment of the method for providing a trained function or one of its aspects when the program portions are executed by the training system.

The application relates, in a ninth embodiment, to a computer-readable storage medium on which are stored program portions that are readable and executable by a provision system, in order to carry out all the steps of an embodiment of the method for providing a constraint image data record and/or a difference image data record or its aspects when the program portions are executed by the provision system; and/or on which are stored program portions that are readable and executable by a training system, in order to carry out all the steps of an embodiment of the method for providing a trained function or one of its aspects when the program portions are executed by the training system.

The application relates, in a possible tenth embodiment, to a computer-readable storage medium on which are stored program portions that are readable and executable by a provision system, in order to carry out all the steps of an embodiment of the method for providing a constraint image data record and/or a difference image data record or its aspects when the program portions are executed by the provision system.

The application relates, in a possible eleventh embodiment, to a computer-readable storage medium on which are stored program portions that are readable and executable by a training system, in order to carry out all the steps of an embodiment of the method for providing a trained function or one of its aspects when the program portions are executed by the training system.

The application relates, in a twelfth embodiment, to a computer program or a computer-readable storage medium comprising a trained function provided by a method for providing a trained function or one of its embodiments.

The application relates, in another embodiment, to a non-transitory computer program product storing a computer program, directly loadable into a training memory of a training system, including program portions to carry out the method of an embodiment when the program portions are executed by the training system.

The application relates, in another embodiment, to a non-transitory computer program product storing a computer program, directly loadable into a memory of a provision system, including program portions to carry out the method of an embodiment when the program portions are executed by the provision system.

The application relates, in another embodiment, to a non-transitory computer-readable storage medium storing program portions, readable and executable by a training system, to carry out the method of an embodiment when the program portions are executed by the training system.

The application relates, in another embodiment, to a non-transitory computer-readable storage medium storing program portions, readable and executable by a provision system, to carry out the method of an embodiment when the program portions are executed by the provision system.

BRIEF DESCRIPTION OF THE DRAWINGS

The above-described properties, features and advantages of this application and the manner in which they are achieved are made more clearly and distinctly intelligible with the following description of the example embodiments which are described in greater detail making reference to the drawings. This description entails no limitation of the invention to these example embodiments. In different figures, the same components are provided with identical reference characters. The drawings are in general not to scale. In the drawings:

FIG. 2 shows two-dimensional first X-ray projections of the examination volume, FIG. 3 shows two-dimensional second X-ray projections of the examination volume.

DETAILED DESCRIPTION OF THE EXAMPLE EMBODIMENTS

Figure 1:
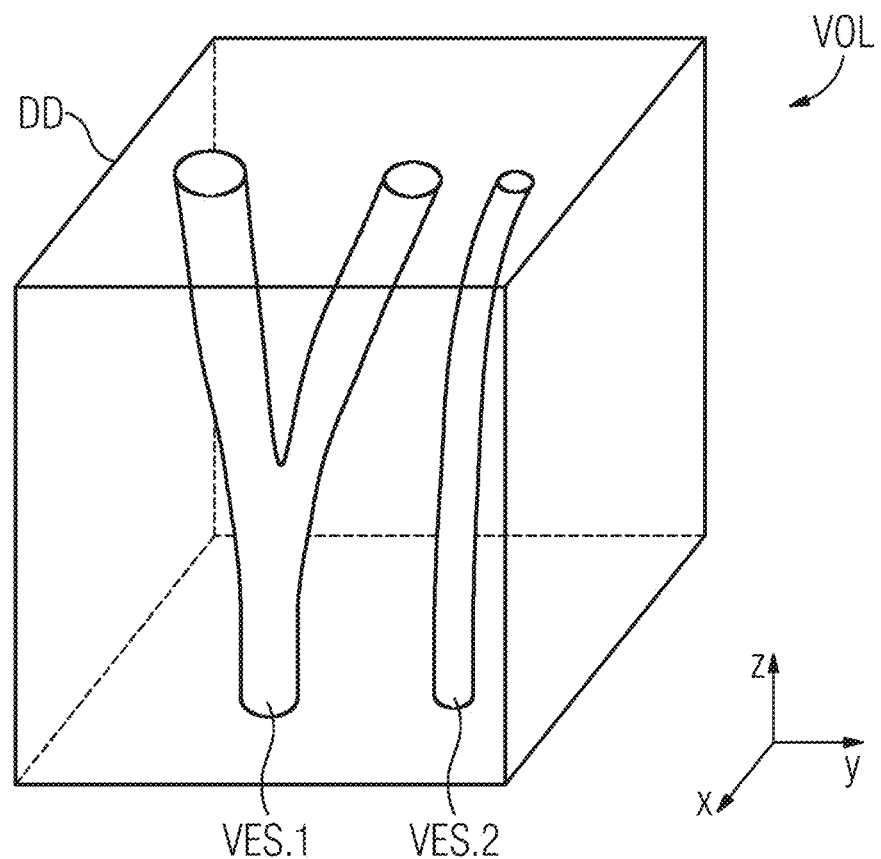
FIG. 1 shows an examination volume with vessels and a three-dimensional difference image data record.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The application, in a first embodiment, is directed to a computer-implemented method for providing a constraint image data record and/or a difference image data record, comprising a receiving of first X-ray projections of the examination volume in respect of a first X-ray energy, and a receiving of second X-ray projections of the examination volume in respect of a second X-ray energy, wherein the second X-ray energy differs from the first X-ray energy. The method further comprises the determination of a multienergetic real image data record of the examination volume based upon the first X-ray projections and the second X-ray projections. Furthermore, the method comprises the selection of first voxels of the multienergetic real image data record based upon the multienergetic real image data record, and the selection of second voxels of the multienergetic real image data record based upon the first X-ray projections and the second X-ray projections, wherein the first voxels comprise the second voxels and wherein the second voxels image contrast medium in the examination volume. The method further comprises the provision of a constraint image data record and/or a difference image data record based upon the second voxels.

In particular, the receiving of the first X-ray projections takes place via an interface, in particular, via an interface of a provision system. In particular, the receiving of the second X-ray projections takes place via the interface, in particular, via the interface of the provision system. In particular, the determination of the multienergetic real image data record takes place via the interface and/or a computer unit, in particular, via the interface of the provision system or via a computer unit of the provision system. In particular, the selection of the first voxels and the selection of the second voxels takes place via the computer unit, in particular, via the computer unit of the provision system. In particular, the determination of the constraint image data record and/or of the difference image data record takes place via the interface and/or the computer unit, in particular via the interface of the provision system or via the computer unit of the provision system.

The first and second X-ray energy correspond herein to the accelerating voltage of an X-ray tube or the energy of an X-ray photon. In particular, the expressions "first X-ray energy" and "second X-ray energy" also denote a first X-ray spectrum and a second X-ray spectrum, wherein an X-ray spectrum corresponds to an intensity distribution of the different wavelengths or energies of X-ray radiation. In particular, X-ray radiation, the accelerating voltage used for generating it, its energy or its spectrum correspond to an X-ray energy, is characterized by this X-ray energy.

An image data record comprises, in particular, a plurality of pixels or voxels. An intensity value is thereby assigned to each pixel or voxel. In an X-ray image data record, in particular, each pixel or voxel is assigned an X-ray intensity value which is a measure for the X-ray intensity incident in this pixel or voxel or for an X-ray absorption coefficient of the pixel or the voxel. An incident X-ray intensity depends upon the number, the size, the shape and the material of the object located in the examination volume and penetrated by the X-ray radiation. An image data record can comprise, in particular, further data, in particular, metadata of an imaging examination, in particular, of an X-ray examination.

A two-dimensional image data record herein comprises at least one two-dimensional representation of an examination volume. A three-dimensional image data record herein comprises at least one three-dimensional representation of an examination volume, and in particular a three-dimensional image data record can also additionally comprise one or more two-dimensional representations of the examination volume.

In particular, the first voxels map contrast media in the examination region with a probability that lies above a first threshold value. The first voxels may also comprise all the voxels of the multienergetic real image data record, but preferably the first voxels are a real subset of the voxels of the multienergetic real image data record. In particular, the second voxels map contrast media in the examination region with a probability that lies, in each case, above a second threshold value. In particular, the first threshold value is lower than the second threshold value.

A first X-ray projection with respect to a first X-ray energy is, in particular, an X-ray projection which has been recorded with X-ray radiation of the first X-ray energy. A second X-ray projection with respect to a second X-ray energy is, in particular, an X-ray projection which has been recorded with X-ray radiation of the second X-ray energy. Each of the first and the second X-ray projections is recorded, in particular, with respect to a projection direction.

A constraint image data record is, in particular, an image data record for emphasizing a structure, in particular, of vessels in the examination volume. In particular, the constraint image data record can assign first values to pixels or voxels which represent the structure or the vessels, and second values to pixels or voxels which do not represent the structure or the vessels, wherein the first and the second values differ. In particular, all the first values can be identical and, in particular, all the second values can be identical. In particular, the constraint image data record can be a binary image data record, i.e. only one value of two possible values can be assigned to a pixel or voxel. The technical term for constraint image data record is "constraining image". A constraint image data record can be used, in particular, for determining by back-projection of individual X-ray projections, a four-dimensional DSA data record, that is, a data record which describes the temporal course of a three-dimensional contrast medium concentration in the examination volume.

The difference image data record and the multienergetic real image data record have, in particular, the same dimensionality. In particular, the difference image data record and the multienergetic real image data record have, in respect of each of the dimensions, the same extent measured in pixels or voxels.

The constraint image data record and the multienergetic real image data record have, in particular, the same dimensionality. In particular, the constraint image data record and the multienergetic real image data record have, in respect of each of the dimensions, the same extent measured in pixels or voxels.

The constraint image data record can be determined, in particular, based upon the second voxels in that the constraint image data record has the same dimensionality as the multienergetic real image data record and in respect of each of the dimensions, the same extent measured in voxels as the multienergetic real image data record. The value 1 can then be assigned, in particular, to a voxel of the constraint image data record if the voxel corresponds to one of the second voxels of the multienergetic real image data record. Alternatively, the intensity value of the corresponding voxel of the multienergetic real image data record can also be assigned to such a voxel. Furthermore, the value 0 can then be assigned, in particular, to a voxel of the constraint image data record if the voxel does not correspond to one of the second voxels of the multienergetic real image data record.

The difference image data record can be determined, in particular, based upon the second voxels in that a subtraction of the multienergetic real image data record and of the constraint image data record is carried out, the result of which being the difference image data record.

The inventors have identified that, based upon a two-stage method as described, a constraint image data record and/or a difference image data record can be provided very efficiently, since the selection of the first voxels can be carried out by way of an inexact but fast method and the selection of the second voxels can be carried out by way of an exact but slow method. In particular, the first method thus presorts the input values of the second method.

Furthermore, by using a first and a second X-ray energy, it is possible to distinguish between materials which have similar X-ray absorption values at one of the two X-ray energies and thus cannot or can only poorly be distinguished on use of only one X-ray energy. Thus, in particular, better distinguishing between different materials can be achieved in the examination region, and the second voxels can be selected in a more exact and, in particular, less error-prone manner.

According to a further embodiment of the application, the selection of the second voxels is based upon a discrete tomography algorithm.

In general, a discrete tomography algorithm is an algorithm which reconstructs an n-dimensional (in particular, at least three-dimensional) discrete data record from a plurality of m-dimensional (in particular, two-dimensional) projections of the n-dimensional data record (with m<n). In particular, the discrete data record can comprise a quantity of voxels. In particular, the discrete data record can be a binary data record, i.e. one value of exactly two values can be assigned to each voxel. An n-dimensional data record can involve, in particular, an n-dimensional image data record. A discrete tomography algorithm can be based, in particular, on an algebraic reconstruction algorithm, for example DART (Discrete Algebraic Reconstruction Algorithm) or SDART (Soft Discrete Algebraic Reconstruction Algorithm), which is known, for example, from the publication by F. Bleichrodt et al.: "SDART: An algorithm for discrete tomography from noisy projections", Computer Vision and Image Understanding, Vol. 129, pp. 63-74, 2014, the entire contents of which are hereby incorporated herein by reference. Furthermore, a discrete tomography algorithm can be based upon a greedy algorithm or a Monte Carlo algorithm.

The inventors have identified that a discrete tomography algorithm is particularly suitable for the selection of voxels, since it can, in particular, generate a binary data record. By this, the second voxels can correspond to the voxels with a first value and the other voxels can correspond to the voxels with a second value.

According to a further embodiment of the application, the selection of the second voxels is based upon a polyenergetic reconstruction algorithm.

A polyenergetic reconstruction algorithm is based upon taking into account the (in particular non-linear) energy-dependent X-ray attenuation of material. In particular, in the case of a polyenergetic reconstruction algorithm, it is assumed that the examination volume is constructed from a specified number of non-overlapping materials (for example bone, contrast medium, metal, water) and, by way of the polyenergetic reconstruction algorithm, the localization and/or the density of the non-overlapping materials is determined based upon the low-dimensional projections. In particular, in the case of a polyenergetic reconstruction algorithm, it can be assumed that a material class is already assigned to each of the voxels, and only the density of the different materials is determined. A polyenergetic reconstruction algorithm can be based, in particular on a statistical image reconstruction. An example of a polyenergetic reconstruction algorithm is given, by way of example, in the publication by I. A. Elbakri and J. A. Fessler: "Statistical Image Reconstruction for Polyenergetic X-Ray Computed Tomography", IEEE Transactions on Medical Imaging, Vol. 21, pp. 89-99, 2002, the entire contents of which are hereby incorporated herein by reference. An alternative expression for "polyenergetic reconstruction algorithm" is "spectral reconstruction algorithm" or "spectral reconstruction".

In particular, a discrete tomography algorithm and a polyenergetic reconstruction algorithm can be used together or combined in order to assign to voxels discrete values, each of which identify or describe a material.

The inventors have identified that by way of a polyenergetic reconstruction algorithm based upon X-ray projections with different energies, it is possible to differentiate particularly well between different materials in the examination region.

According to a further embodiment of the application, the polyenergetic reconstruction algorithm classifies voxels as contrast medium voxels or as metal voxels, wherein a contrast medium voxel maps contrast medium in the examination volume and wherein a metal voxel maps metal in the examination volume. In particular, contrast medium voxels can then be selected as second voxels.

The inventors have identified that, based upon the classification into contrast medium voxels and metal voxels by the polyenergetic reconstruction algorithm, a particularly exact constraint image data record and/or difference image data record can be determined and, in particular, metal artifacts in the constraint image data record and/or in the difference image data record can be prevented.

According to a further embodiment of the application, the selection of the first voxels is based upon a use of a trained function on the multienergetic real image data record.

A trained function maps input data onto output data. For this purpose, the output data can further depend upon one or more parameters of the trained function. The one or more parameters of the trained function can be determined and/or adapted by training. The determination and/or the adaptation of the one or more parameters of the trained function can be based, in particular, upon a pair made from training input data and associated training output data, wherein the trained function is applied to the training input data for generating training mapping data. In particular, the determination and/or the adaptation can be based upon a comparison of the training mapping data and the training output data. In general, a trainable function, that is, a function with not yet adapted, one or more parameters, can be designated a trained function.

Other expressions for a trained function are trained mapping rule, mapping rule with trained parameters, function with trained parameters, algorithm based upon artificial intelligence, algorithm of machine learning. A further example of a trained function is an artificial neural network wherein the edge weights of the artificial neural network correspond to the parameters of the trained function. In place of the expression "neural network", the expression "neural net" can also be used. In particular, a trained function can also be a "deep neural network" (or "deep artificial neural network"). An example of a trained function is a "support vector machine" and furthermore, in particular, other algorithms of machine learning are also usable as a trained function.

The inventors have identified that, based upon a trained function, the first voxels can be selected particularly efficiently.

According to a further embodiment of the application, the trained function assigns a probability value to a voxel of the multienergetic real image data record, wherein the probability value of the voxel corresponds to the probability that the voxel maps contrast medium. In particular, the trained function assigns a probability value to each voxel of the multienergetic real image data record, wherein the probability value of each voxel corresponds to the probability that the respective voxel maps contrast medium. In particular, the quantity of the probability values can be interpreted as a probability image data record.

The inventors have identified that trained functions, in particular neural networks are suitable, in particular, for classification tasks. Furthermore, through the use of a probability value as an output value (as distinct from the use of a binary value), information can be determined also with what level of reliability a voxel maps a contrast medium.

According to a further embodiment of the application, the selection of the first voxels is based upon a comparison of probability values of voxels with a specified threshold value. The threshold value corresponds, in particular, to the first threshold value.

The inventors have identified that, through the use of a threshold value, the first voxels can be selected particularly efficiently.

According to a further embodiment of the application, the determination of the multienergetic real image data record comprises an at least three-dimensional reconstruction of the first X-ray projections and of the second X-ray projections. In particular, the reconstruction of the first X-ray projections and of the second X-ray projections is independent of the first X-ray energy and the second X-ray energy and/or the reconstruction is a reconstruction without taking account of the X-ray energy.

In general, a reconstruction denotes the determination of an n-dimensional image data record based upon a plurality of m-dimensional image data records, wherein m<n. Herein, the plurality of m-dimensional image data records are, in particular, projections of an n-dimensional volume which is to be described by way of the n-dimensional image data record. In particular, a reconstruction can denote the determination of a three-dimensional image data record based upon a plurality of two-dimensional image data records.

Such a reconstruction can be based, for example, on a filtered back-projection, or alternatively iterative reconstruction methods or the Feldkamp algorithm are known to a person skilled in the art.

The inventors have identified that three-dimensional real image data records are particularly suitable for representing the properties of the examination volume. In particular, by way of three-dimensional multienergetic real image data records, almost complete information regarding the examination volume can be acquired.

According to a further embodiment of the application, during the recording of the first X-ray projections, the examination volume comprises contrast medium and/or during the recording of the second X-ray projections, the examination volume comprises contrast medium. In particular, the examination volume comprises contrast medium if one or more vessels in the examination volume contain contrast medium. In particular, the concentration of the contrast medium is variable over time. The inventors have identified that the trained function can extract vessel structures particularly well if these are emphasized by the presence of contrast medium.

According to a further embodiment of the application, the first X-ray projections and the second X-ray projections were recorded simultaneously. Herein, the first X-ray projections and the second X-ray projections are designated simultaneously recorded if the first X-ray projections and the second X-ray projections were recorded within a time interval of 30 s or less, in particular within a time interval of 20 s or less, in particular within a time interval of 10 s or less, in particular within a time interval of 5 s or less.

The inventors have identified that with simultaneous recording of the first and second X-ray projections, they each map the same or a similar temporal state of the examination volume. By this, the multienergetic real image data record also describes the same or a similar state of the examination volume and by way of this state, information in respect of both the first and also the second X-ray energy are available.

According to a further embodiment of the application, the first X-ray projections are recordings of a first X-ray source and a first X-ray detector and the second X-ray projections are recordings of a second X-ray source and a second X-ray detector.

In particular, the first X-ray source differs from the second X-ray source, and in particular, the second X-ray detector differs from the first X-ray detector. In particular, the first and the second X-ray source have the same construction and/or the same type, and/or the first X-ray detector and the second X-ray detector have the same construction and/or the same type.

The inventors have identified that by way of two X-ray sources and by way of two X-ray detectors, the first X-ray projections and the second X-ray projections can be recorded independently of one another. In particular, thereby, necessary movements between recordings of the first X-ray projections and the second X-ray projections can be reduced, in particular if the first X-ray projections and the second X-ray projections are recorded alternatingly. Furthermore, thereby, the first X-ray source can be operated with the first X-ray energy and the second X-ray source can be operated with the second X-ray energy, so that switching processes between the first and the second X-ray energy can be dispensed with.

According to a further embodiment of the application, a biplanar X-ray device comprises the first X-ray source, the second X-ray source, the first X-ray detector and the second X-ray detector. The inventors have identified that by the use of a biplanar X-ray device, the first X-ray source and the first X-ray detector can be better coordinated with the second X-ray source and the second X-ray detector. In particular, a registration of the first X-ray source and of the first X-ray detector in respect of the first X-ray source and the second X-ray detector can be dispensed with since the relative positions of the X-ray sources and the X-ray detectors in a biplanar X-ray device are known.

According to a further embodiment of the application, each of the first X-ray projections is an X-ray projection of the examination volume in respect of a projection direction from a first projection angle region and each of the second X-ray projections is an X-ray projection of the examination volume in respect of a projection direction from a second projection angle region, wherein the first projection angle region and the second projection angle region differ.

The projection direction of an X-ray projection is, in particular, the direction from the position of an X-ray source to the position of an X-ray detector at the time point of the recording of the X-ray projection, wherein the X-ray projection has been recorded via the X-ray source and via the X-ray detector. A projection direction can be regarded, in particular, as a vector or as a straight line in space.

A projection angle region comprises a plurality of projection directions. In particular, the projection angle region can also be regarded as a solid angle region in respect of a point of the examination volume, in particular, in respect of the middle point of the examination volume. In particular, in this case, the plurality of projection directions in respect of the point of the examination volume lies in this solid angle region. Alternatively, the projection angle region can also be regarded as a locus curve of an X-ray detector on recording X-ray projections. In particular, the projection angle region can also be regarded as a circular arc. In particular, the projection angle region can also be regarded as a convex envelope of the plurality of projection directions.

The inventors have identified that (under the assumption that the first projection angle region and the second projection angle region have a fixed size) first and second X-ray projections from different projection angle regions contain more spatial information regarding the examination region than from the same projection angle regions. Herein, the better spatial information can relate both to the size of the angular region covered and also to the angular resolution.

According to a further embodiment of the application, the first projection angle region and the second projection angle region are disjoint. The first projection angle region and the second projection angle region are, in particular, disjoint if no projection direction of the first projection angle region is included in the second projection angle region and if no projection direction of the second projection angle region is included in the first projection angle region. The inventors have identified that by way of disjoint projection angle regions, a particularly large angular region can be covered.

According to a further embodiment of the application, the first projection angle region includes the second projection angle region or the second projection angle region includes the first projection angle region. The inventors have identified that through the use of overlapping projection angle regions both for the first and also for the second X-ray energy, a complete angular information is available, and therefore, in particular for the entire angular region, by way of the trained function, it is possible to differentiate between different materials.

A further embodiment of the application relates to a method for providing a trained function comprising a determination of a multienergetic training real image data record of a training examination volume in respect of a first training X-ray energy and a second training X-ray energy, wherein the second training X-ray energy differs from the first training X-ray energy; and to a determination of a training constraint image data record of the training examination volume. The method further comprises determining first training voxels of the training real image data record by applying the trained function to the training real image data record; adapting the trained function based upon a comparison of the first training voxels and of the training constraint image data record; and providing the trained function.

The determination of the multienergetic training real image data record takes place, in particular, via a training interface and/or a training computer unit, in particular via the training interface of a training system and/or via a training computer unit of the training system. The determination of the training constraint image data record takes place, in particular, via the training interface and/or via the training computer unit, in particular via the training interface of the training system and/or via the training computer unit of the training system. The determination of first training voxels and the adaptation of the trained function takes place, in particular via the training computer unit, in particular, via the training computer unit of the training system. The provision of the trained function takes place, in particular, via the training computer unit, in particular via the training computer unit of the training system.

The adaptation of the trained function comprises, in particular, the adaptation of at least one parameter of the trained function. If the trained function is an artificial neural network, the parameters of the trained function are, in particular, the edge weights of the trained function. The comparison of the first training voxel and the training constraint image data record takes place, in particular, based upon a cost function, wherein the cost function represents the deviation of the first training voxel and the training constraint image data record to one or more numbers. The adaptation of the trained function or of the at least one parameter takes place, in particular by minimizing the cost function, in particular, in the case of an artificial neural network as the trained function based upon the backpropagation algorithm.

The inventors have identified that with the method described, a trained function can be efficiently adapted and provided for use in a method for providing a constraint image data record and/or a difference image data record.

According to a further embodiment of the application, the method for providing a trained function further comprises receiving first training X-ray projections of the training examination volume in respect of the first X-ray energy and receiving second training X-ray projections of the training examination volume in respect of the second X-ray energy. Furthermore, the determination of the training constraint image data record comprises a polyenergetic reconstruction of a voxel of the multienergetic training real image data record based upon the first training X-ray projections and the second training X-ray projections.

The receiving of the first training X-ray projections and the second training X-ray projections can take place, in particular, via the interface, in particular, via the interface of the training system.

The inventors have identified that by way of a polyenergetic reconstruction, a particularly exact training constraint image data record can be determined, since it is possible to differentiate well between different materials in the examination volume. By this, a trained function adapted based upon the training constraint image data record can provide particularly exact results.

According to a further embodiment of the application, the determination of the multienergetic training real image data record comprises a reconstruction of the first training X-ray projections and of the second training X-ray projections.

The inventors have identified that three-dimensional training real image data records are particularly suitable for representing the properties of the training examination volume. In particular, by way of three-dimensional multienergetic training real image data records, almost complete information regarding the training examination volume can be acquired, and therefore such reconstructed three-dimensional multienergetic training real image data records are particularly suitable as a basis for the adaptation of the trained function.

According to a further embodiment of the application, the method for providing a trained function further comprises receiving a three-dimensional material model of the training examination volume, wherein the multienergetic training real image data record is based upon a simulation of an interaction between X-ray radiation and the three-dimensional material model, and wherein the training constraint image data record is based upon the three-dimensional material model.

In particular, the receiving of the three-dimensional material model can take place via the interface, in particular, via the interface of the training system.

A material model assigns, in particular, a material property to a set of spatial locations. The spatial locations can be defined, in particular, by voxels. A material property can be, in particular, an X-ray absorption coefficient or a function which defines the X-ray absorption coefficient dependent upon the X-ray energy.

A training real image data record can be simulated, in particular, in that the interaction of X-ray radiation of the first X-ray energy and/or of the second X-ray energy in respect of a projection direction is simulated with the spatial distribution of the material properties. The simulation can take place, in particular, by way of a Monte Carlo simulation. In particular, initially, first training X-ray projections and second training X-ray projections can be determined by simulation of the interaction of X-ray radiation with the material model and the multienergetic training real image data record can be determined by reconstruction of the first training X-ray projections and the second training X-ray projections.

A training constraint image data record can be based, in particular, upon the material model in that the material model comprises information regarding the structures shown. In particular, the material model can comprise a further parameter which defines whether a pixel or voxel corresponds to a structure, in particular a vessel, in the training examination volume. Alternatively, the information regarding the structures shown can also be derived from the material properties.

The inventors have identified that, based upon a material model of the examination region, both the multienergetic training real image data record and also the training constraint image data record can be determined. In this way, the adaptation of the trained function, in particular, to simulation data can take place without the use of real data. In particular, it is not necessary for the training process, to expose patients or training examination volumes to a radiation burden by way of X-ray radiation.

In a further embodiment, the application relates to a provision system for providing a constraint image data record and/or a difference image data record, comprising an interface and a computer unit,
wherein the interface is configured for receiving first X-ray projections of the examination volume in respect of a first X-ray energy,
wherein the interface is further configured for receiving second X-ray projections of the examination volume in respect of a second X-ray energy,
wherein the second X-ray energy differs from the first X-ray energy,
wherein the computer unit is configured for determining a multienergetic real image data record of the examination volume based upon the first X-ray projections and the second X-ray projections,
wherein the computer unit is further configured for selecting first voxels of the multienergetic real image data record based upon the multienergetic real image data record,
wherein the computer unit is further configured for selecting second voxels of the multienergetic real image data record based upon the first X-ray projections and the second X-ray projections,
wherein the first voxels comprise the second voxels, and the second voxels map contrast medium in the examination volume,
wherein the interface and/or the computer unit is configured for providing a constraint image data record and/or a difference image data record based upon the second voxels.

Such a provision system can be configured, in particular, to carry out an embodiment of the previously described inventive method for providing a constraint image data record and/or a difference image data record and its aspects. The provision unit is configured to carry out an embodiment of the method and its aspects in that the interface and the computer unit are configured to carry out the corresponding method steps.

The application relates in a fourth embodiment to an X-ray device comprising a provision system according to an embodiment of the invention. In particular, the X-ray device comprises a first X-ray source, a second X-ray source, a first X-ray detector and a second X-ray detector. In particular, the first X-ray source and the first X-ray detector are configured to rotate simultaneously around an examination volume. In particular, the second X-ray source and the second X-ray detector are configured to rotate simultaneously around the examination volume. The X-ray device is, in particular, a dual-source C-arm X-ray system or a dual-source computed tomography device.

In a fifth embodiment, the application relates to a training system for providing a trained function comprising a training interface and a training computer unit,
wherein the training interface and/or the training computer unit are configured for determining a multienergetic training real image data record of a training examination volume in respect of a first training X-ray energy and a second training X-ray energy,
wherein the second training X-ray energy differs from the first training X-ray energy,
wherein the training interface and/or the training computer unit are configured for determining a training constraint image data record of the training examination volume,
wherein the training computer unit is configured for determining first training voxels of the training real image data record by applying the trained function to the training real image data record, wherein the training computer unit is configured for adapting the trained function based upon a comparison of the first training voxels and the training constraint image data record, wherein the training interface is configured for providing the trained function.

Such a training system can be configured, in particular, to carry out an embodiment of the previously described inventive method for providing a trained function and to perform its aspects. The training system is configured to carry out an embodiment of the method and its aspects in that the training interface and the training computer unit are configured to carry out the corresponding method steps.

The application relates, in a sixth embodiment, to a computer program product having a computer program which is directly loadable into a memory of a provision system, having program portions in order to carry out all the steps of an embodiment of the method for providing a constraint image data record and/or a difference image data record or its aspects when the program portions are executed by the provision system; and/or which is directly loadable into a training memory of a training system, having program portions in order to carry out all the steps of an embodiment of the method for providing a trained function or one of its aspects when the program portions are executed by the training system.

The application relates, in a possible seventh embodiment, to a computer program product having a computer program which is directly loadable into a memory of a provision system, having program portions in order to carry out all the steps of an embodiment of the method for providing a constraint image data record and/or a difference image data record or its aspects when the program portions are executed by the provision system.

The application relates, in a possible eighth embodiment, to a computer program product having a computer program which is directly loadable into a training memory of a training system, having program portions in order to carry out all the steps of an embodiment of the method for providing a trained function or one of its aspects when the program portions are executed by the training system.

The application relates, in a ninth embodiment, to a computer-readable storage medium on which are stored program portions that are readable and executable by a provision system, in order to carry out all the steps of an embodiment of the method for providing a constraint image data record and/or a difference image data record or its aspects when the program portions are executed by the provision system; and/or on which are stored program portions that are readable and executable by a training system, in order to carry out all the steps of an embodiment of the method for providing a trained function or one of its aspects when the program portions are executed by the training system.

The application relates, in a possible tenth embodiment, to a computer-readable storage medium on which are stored program portions that are readable and executable by a provision system, in order to carry out all the steps of an embodiment of the method for providing a constraint image data record and/or a difference image data record or its aspects when the program portions are executed by the provision system.

The application relates, in a possible eleventh embodiment, to a computer-readable storage medium on which are stored program portions that are readable and executable by a training system, in order to carry out all the steps of an embodiment of the method for providing a trained function or one of its aspects when the program portions are executed by the training system.

The application relates, in a twelfth embodiment, to a computer program or a computer-readable storage medium comprising a trained function provided by a method for providing a trained function or one of its embodiments.

A realization largely through software has the advantage that conventionally used provision units and/or training systems can also easily be upgraded with a software update in order to operate in the manner according to the application. Such a computer program product can comprise, where relevant, in addition to the computer program product, further components, such as, for example, documentation and/or additional components including hardware components, for example, hardware keys (dongles, etc.) for using the software.

FIG. 1 shows an examination volume VOL with two vessels VES.1, VES.2, and a three-dimensional difference image data record DD. Herein, the image region of the difference image data record DD corresponds to the examination volume VOL. In the example embodiment shown, the examination volume VOL comprises a first vessel VES.1 and a second vessel VES.2, wherein the first vessel VES.1 divides into two branches within the examination volume VOL. It is also possible that the examination volume VOL comprises no vessel VES.1, VES.2, exactly one vessel VES.1, VES.2 or more than two vessels VES.1, VES.2. The examination volume VOL comprises, apart from the vessels VES.1, VES.2, further structures OS.1, OS.2 which are not mapped in the three-dimensional first difference image data record DD, since they are to be included with the background and therefore are not mapped in the three-dimensional first difference image data record.

In the example embodiment shown, the examination volume VOL and the difference image data record DD extend relative to a first direction x, a second direction y and a third direction z. The first direction x, the second direction y and the third direction z are herein orthogonal in pairs.

FIG. 2 shows a plurality of first X-ray projections XP.1a, . . . , XP.1d of the examination volume VOL in respect of a first X-ray energy, while FIG. 3 shows a plurality of second X-ray projections XP.2a, . . . , XP.2d of the examination volume VOL in respect of a second X-ray energy, wherein the second X-ray energy differs from the first X-ray energy. In the example embodiment shown, the first X-ray projections XP.1a, . . . , XP.1d form a first real image data record RD.1 and the second X-ray projections XP.2a, . . . , XP.2d form a second real image data record RD.2. Alternatively, the first real image data record RD.1 can also be determined based upon a three-dimensional reconstruction of the first X-ray projections XP.1a, . . . , XP.1d, and/or the second real image data record RD.2 can be determined based upon a three-dimensional reconstruction of the second X-ray projections XP.2a, . . . , CP.2d.

In the example embodiment shown, four two-dimensional X-ray projections XP.1a, . . . , XP.1d, XP.2a, . . . , XP.2d are shown in each case and more or fewer two-dimensional X-ray projections XP.1a, . . . , XP.1d, XP.2a, . . . , XP.2d can also be present or used.

Each of the two-dimensional X-ray projections XP.1a, . . . , XP.1d, XP.2a, . . . , XP.2d is herein an X-ray projection of the examination volume VOL in respect of a projection direction. Each of the two-dimensional X-ray projections XP.1a, XP.2a, is an X-ray projection of the examination volume VOL in respect of a projection direction, wherein the projection direction is antiparallel to the first direction x. Each of the two-dimensional X-ray projections XP.1b, XP.2b, is an X-ray projection of the examination volume VOL in respect of a projection direction, wherein the projection direction is antiparallel to the second direction y. Each of the two-dimensional X-ray projections XP.1c, XP.2c, is an X-ray projection of the examination volume VOL in respect of a projection direction, wherein the projection direction is parallel to the first direction x. Each of the two-dimensional X-ray projections XP.1d, XP.2d, is an X-ray projection of the examination volume VOL in respect of a projection direction, wherein the projection direction is parallel to the second direction y.

Furthermore, a time point is assigned to each of the two-dimensional X-ray projections XP.1a, . . . , XP.1d, XP.2a, . . . , XP.2d, wherein this time point in this example embodiment corresponds to the time point of the recording of the respective X-ray projection XP.1a, . . . , XP.1d, XP.2a, . . . , XP.2d.

In the example embodiment shown, each of the two-dimensional X-ray projections XP.1a, . . . , XP.1d, XP.2a, . . . , XP.2d maps the vessels VES.1, VES.2 contained within the examination volume VOL. Furthermore, other structures OS.1, OS.2 in the examination volume VOL are mapped by the two-dimensional X-ray projections XP.1a, . . . , XP.1d, XP.2a, . . . , XP.2d.

At the different time points of the recording of the two-dimensional X-ray projections XP.1a, . . . , XP.1d, XP.2a, . . . , XP.2d, the vessels VES.1, VES.2 contain temporally changeable concentrations CA.1, . . . , CA.4 of contrast medium. Herein, the vessels VES.1, VES.2 have a contrast medium concentration CA.1 at the recording of the X-ray projections XP.1a, XP.2a. Furthermore, the vessels VES.1, VES.2 have a contrast medium concentration CA.2 at the recording of the X-ray projections XP.1b, XP.2b. Furthermore, the vessels VES.1, VES.2 have a contrast medium concentration CA.3 at the recording of the X-ray projections XP.1c, XP.2c. Furthermore, the vessels VES.1, VES.2 have a contrast medium concentration CA.4 at the recording of the X-ray projections XP.1d, XP.2d. The contrast medium is an X-ray contrast medium so that the respective contrast medium concentration CA.1, . . . , CA.4 of the contrast medium is determinable from the X-ray projections XP.1a, . . . , XP.1d, XP.2a, . . . , XP.2d. The contrast medium concentration CA.1, . . . , CA.4 changes over time due to a static or dynamic liquid flow in the vessels VES.1, VES.2. In the example embodiment shown, the fluid is blood.

In the recording of the first X-ray projections XP.1a, . . . , XP.1d with the first X-ray energy as shown in FIG. 2, the contrast medium and the first other structure OS.1 (for example, a bone structure) have a similar X-ray absorption. Therefore, the contrast medium and the first other structure OS.1 are barely able to be distinguished, based upon the first X-ray projections XP.1a, XP.1d. However, the contrast medium and the second other structure OS.2 (for example, a metal structure) have a different X-ray absorption and are therefore easy to distinguish.

In the recording of the second X-ray projections XP.2a, . . . , XP.2d with the second X-ray energy as shown in FIG. 3, the contrast medium and the second other structure OS.2 (for example, a metal structure) have a similar X-ray absorption. Therefore, the contrast medium and the second other structure OS.2 are barely to be distinguished, based upon the second X-ray projections XP.2a, XP.2d. However, the contrast medium and the first other structure OS.1 (for example, a metal structure) have a different X-ray absorption and are therefore easy to distinguish.

An exact differentiation between the contrast medium and the other structures OS.1, OS.2 is therefore advantageously possible by way of a first real image data record RD.1 and a multienergetic real image data record RD.M.

Figure 4:
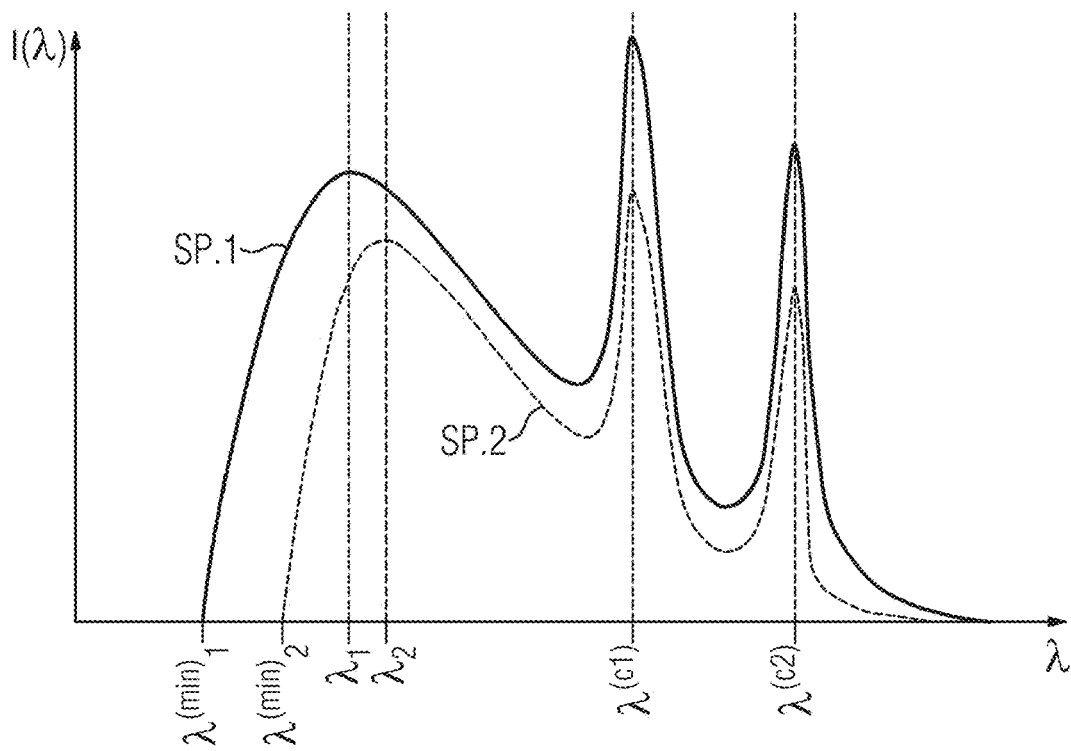
FIG. 4 shows a first X-ray spectrum and a second X-ray spectrum.

FIG. 4 shows a first X-ray spectrum SP.1 and a second X-ray spectrum SP.2 which have been generated via an X-ray tube as the X-ray source SRC.1, SRC.2. Herein, the first X-ray spectrum SP.1 corresponds to a first X-ray energy $E_1$ or a first accelerating voltage $U_1=E_1/e$ (wherein e corresponds to the elementary charge), and the second X-ray spectrum corresponds to a second X-ray energy $E_2$ or a second accelerating voltage $U_2=E_2/e$, wherein the first X-ray energy $E_1$ or the first accelerating voltage $U_1$ is greater than the second X-ray energy $E_2$ or the second accelerating voltage $U_2$. In the graph, the intensity $I(\lambda)$ of the X-ray radiation is given as a function of the wavelength $\lambda$ of the X-ray radiation. The intensity $I(\lambda)$ is herein proportional to the number of X-ray photons of the wavelength $\lambda$, which are generated by the X-ray source SRC.1, SRC.2.

According to the Duane-Hunt law, the X-ray spectrum SP.1, SP.2 has a minimum wavelength $\lambda^{(min)}=hc/eU$ (wherein c is the velocity of light and h is the Planck constant), so that the minimum wavelength $\lambda^{(min)}_1$ of the first X-ray spectrum SP.1 is smaller here than the minimum wavelength $\lambda^{(min)}_2$ of the second X-ray spectrum. Furthermore, the X-ray spectrum according to Kramer's law has a relative intensity maximum at a wavelength of $\lambda_{1/2}=2\lambda^{(min)}_{1/2}$.

Furthermore, the first and second X-ray spectra SP.1, SP.2 have peaks of characteristic X-ray radiation at one or more characteristic wavelengths $\lambda^{(c1)}$, $\lambda^{(c2)}$. The characteristic wavelengths $\lambda^{(c1)}$, $\lambda^{(c2)}$ are herein not dependent upon the accelerating voltage $U_1$, $U_2$ or the X-ray energy $E_1$, $E_2$, but rather on the anode material of the X-ray tube. The characteristic X-ray radiation arises due to transitions between energy levels of the inner electron shell of the anode material.

Figure 5:
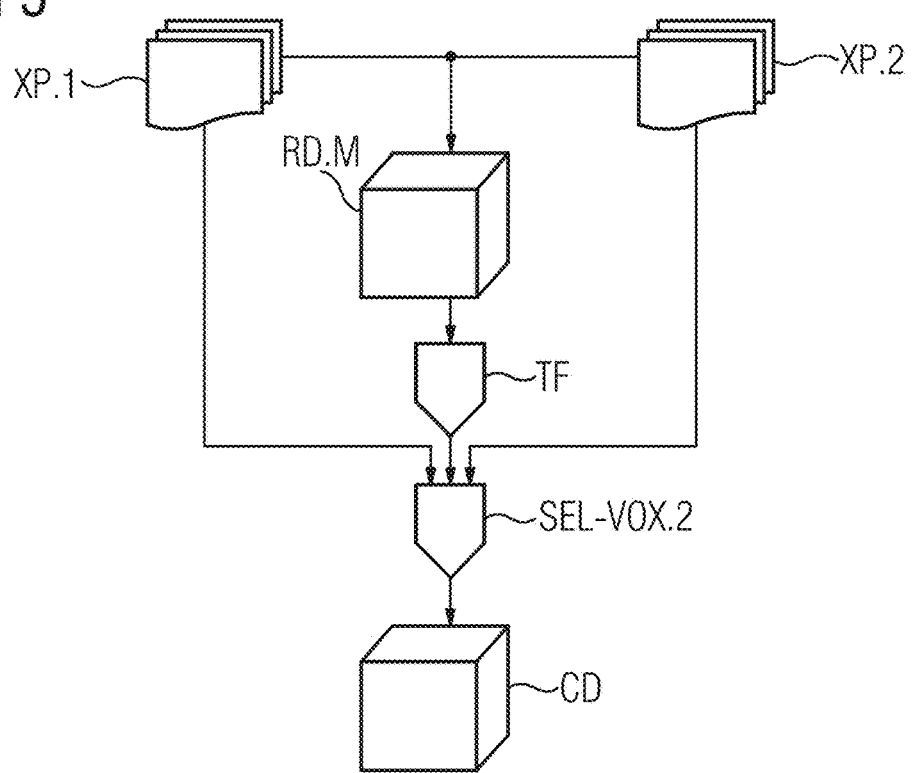
FIG. 5 shows a first example embodiment of the data flow of a method for determining a difference image data record.

FIG. 5 shows a first example embodiment of the data flow of a method for providing a constraint image data record CD and/or a difference image data record DD. In this example embodiment, the multienergetic real image data record RD.M is a three-dimensional image data record of the examination volume VOL, and the first X-ray projections XP.1 and the second X-ray projections XP.2 are a plurality of two-dimensional X-ray projections of the examination volume VOL. The constraint image data record CD is also a three-dimensional image data record of the examination volume VOL. A difference image data record DD which is not shown is also a three-dimensional image data record of the examination volume VOL.

In this example embodiment, the multienergetic real image data record RD.M is a three-dimensional reconstruction of the first X-ray projections XP.1 and the second X-ray projections XP.2, wherein the first X-ray projections XP.1 are X-ray projections of the examination volume VOL in respect of the first X-ray energy $E_1$ and wherein the second X-ray projections XP.2 are X-ray projections of the examination volume VOL in respect of the second X-ray energy $E_2$.

In this example embodiment, the multienergetic real image data record RD.M, the constraint image data record CD and the difference image data record DD have, in respect of each of the dimensions, the same extent measured in voxels. For example, the multienergetic real image data record RD.M, the constraint image data record CD and the difference image data record DD can have an extent of 512 voxels in respect of the first dimension, in respect of the second dimension, an extent of 512 voxels, and in respect of the third dimension, an extent of 512 voxels (in total, therefore approximately $134 \cdot 10^6$ voxels).

The trained function TF receives in this example embodiment as input data the multienergetic real image data record RD.M and generates a probability data record as output data. The probability data record can be used for determining the first voxels VOX.1, for example based upon a threshold value.

Furthermore, the selection SEL-VOX.2 of the second voxels VOX.2 in this example embodiment is based upon the first voxels VOX.1 and upon the first X-ray projections XP.1 and the second X-ray projections XP.2.

Figure 6:
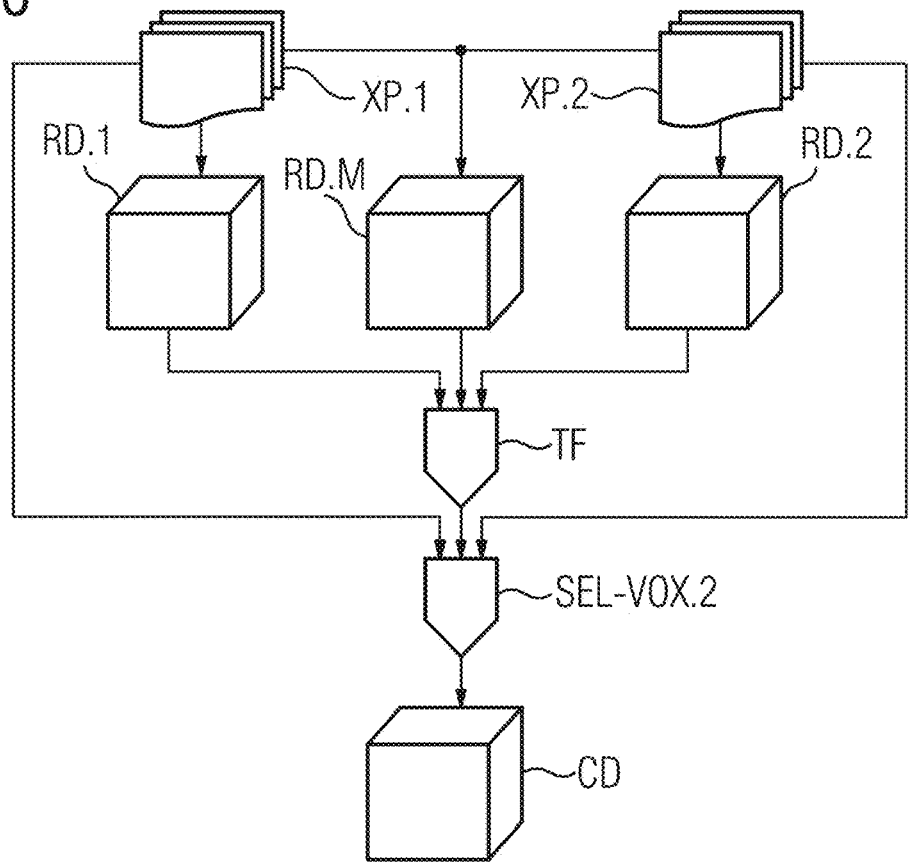
FIG. 6 shows a second example embodiment of the data flow of a method for determining a difference image data record.

FIG. 6 shows a second example embodiment of the data flow of a method for providing a constraint image data record CD and/or a difference image data record DD. In this example embodiment, the first real image data record RD.1, the second real image data record RD.2 and the multienergetic real image data record RD.M are each three-dimensional image data records of an examination volume VOL, and the constraint image data record CD and an optional difference image data record DD are also three-dimensional image data records of the examination volume VOL.

In this example embodiment, the first real image data record RD.1 is a three-dimensional reconstruction of first X-ray projections XP.1, wherein the first X-ray projections XP.1 are X-ray projections of the examination volume VOL in respect of the first X-ray energy $E_1$. Furthermore, the second real image data record RD.2 is a three-dimensional reconstruction of second X-ray projections XP.2, wherein the second X-ray projections XP.2 are X-ray projections of the examination volume VOL in respect of the second X-ray energy $E_2$. Furthermore, the multienergetic real image data record RD.M is a three-dimensional reconstruction of the first X-ray projections XP.1 and the second X-ray projections XP.2. The first X-ray projections XP.1 and the second X-ray projections XP.2 are, in particular, two-dimensional X-ray projections of the examination volume VOL, in particular, in respect of a plurality of projection directions in each case.

In this example embodiment, the first real image data record RD.1 and the second real image data record RD.2 have the same extent measured in voxels in respect of each dimension. For example, the first real image data record RD.1 and the second real image data record RD.2 have an extent of 256 voxels in respect of the first dimension, in respect of the second dimension, an extent of 256 voxels, and in respect of the third dimension, an extent of 256 voxels (in total, therefore approximately $17 \cdot 10^6$ voxels). Furthermore, the multienergetic real image data record RD.M has a greater extent measured in voxels, in respect of each dimension, in this example embodiment than the first real image data record RD.1. For example, the multienergetic real image data record RD.M can have an extent of 512 voxels in respect of the first dimension, in respect of the second dimension, an extent of 512 voxels, and in respect of the third dimension, an extent of 512 voxels (in total, therefore approximately $134 \cdot 10^6$ voxels).

In this example embodiment, the trained function TF receives as input data the first real image data record RD.1, the second real image data record RD.2 and the multienergetic real image data record RD.M. Alternatively, the trained function TF could receive as input data just the first real image data record RD.1 and the multienergetic real image data record RD.M. Furthermore, as output data, the trained function TF generates a probability data record. The probability data record can be used for determining the first voxels VOX.1, for example based upon a threshold value.

In this example embodiment, the constraint image data record CD and the optional difference image data record DD have, in respect of each dimension, the same extent measured in voxels as the multienergetic real image data record RD.M, and furthermore, the probability data record is, in particular, a three-dimensional probability data record which, in respect of each dimension, has the same extent measured in voxels as the multienergetic real image data record RD.M. For example, the constraint image data record CD, the difference image data record DD, the multienergetic real image data record RD.M and the probability data record can have an extent of 512 voxels in respect of the first dimension, in respect of the second dimension, an extent of 512 voxels, and in respect of the third dimension, an extent of 512 voxels (in total, therefore approximately $134 \cdot 10^6$ voxels).

Figure 7:
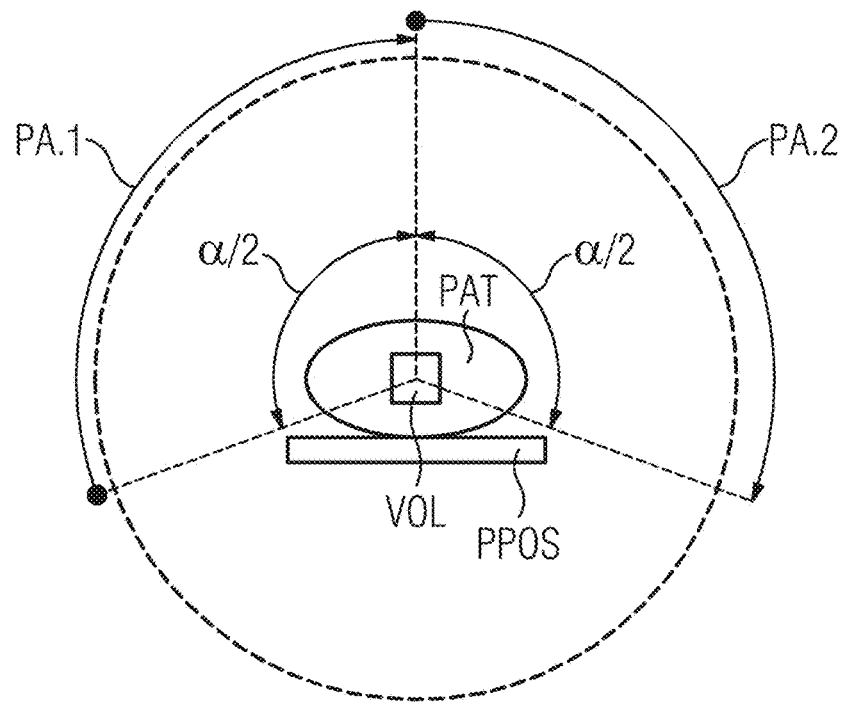
FIG. 7 shows a first example embodiment of a first projection angle region and a second projection angle region.

FIG. 7 shows a first example embodiment of a first projection angle region PA.1 and a second projection angle region PA.2. The projection angle regions PA.1, PA.2 shown can be used, in particular, for recording first X-ray projections XP.1 and/or second X-ray projections XP.2 upon which a first real image data record RD.1 and/or a second real image data record RD.2 and/or a multienergetic real image data record RD.M are based.

The projection angle regions PA.1, PA.2 describe the projection directions of X-ray projections XP.1, XP.2 of an examination volume VOL. Herein, the examination volume VOL is part of a patient PAT, wherein the patient PAT is arranged on a patient positioning apparatus PPOS. Herein, the first projection angle region PA.1 shows possible positions, in particular, of a first X-ray source SRC.1 during the recording of first X-ray projections XP.1. Herein, the associated first X-ray detector DTC.1 is arranged on the opposite side of the first X-ray source SRC.1 relative to the examination volume VOL. Furthermore, the second projection angle region PA.2 shows possible positions of a first X-ray source SRC.1 or of a second X-ray source SRC.2 during the recording of second X-ray projections XP.2. Herein, the associated first X-ray detector DTC.1 or the associated second X-ray detector DTC.2 is arranged on the opposite side of the first X-ray source SRC.1 or the second X-ray source SRC.2 relative to the examination volume VOL. In particular, a projection angle region PA.1, PA.2 can also be interpreted as a set of projection directions.

In particular, the first projection angle region PA.1 can thus also be regarded as the locus curve of the first X-ray source SRC.1 on recording the first X-ray projections XP.1, and the second projection angle region PA.2 can also be regarded as the locus curve of the first X-ray source SRC.1 on recording the second X-ray projections XP.2, if the second X-ray projections XP.2 are recorded with the same X-ray source SRC.1 as the first X-ray projections XP.1, or as the locus curve of the second X-ray source SRC.2, if the second X-ray projections XP.2 are recorded with a second X-ray source SRC.2 that is distinct from the first X-ray source SRC.1.

In particular, the first projection angle region PA.1 can also be identified with a circular rotation of the first X-ray source SRC.1 around the examination volume VOL, wherein the first X-ray source SRC.1 describes a circular arc with an angle $\alpha/2$. Furthermore, in particular, the second projection angle region PA.2 can be identified with a circular rotation of the second X-ray source SRC.2 around the examination volume VOL, wherein the second X-ray source SRC.2 also describes a circular arc with an angle α/2. Alternatively to the circular rotations and arcs, elliptical rotations or elliptical arcs or other at least partially concave movements of the first or the second X-ray source SRC.1, SRC.2 are possible. The angle α is herein, in particular, greater than 180°, in particular, the angle α corresponds to the sum of 180° and the aperture angle of the X-ray radiation emerging from the first or second X-ray source SRC.1, SRC.2. In particular, therefore, in this example embodiment, the angle α corresponds to 200°.

FIG. 7 shows the first projection angle region PA.1 and the second projection angle region PA.2 with a different radius. The different radius was selected, in particular, for reasons of the clarity of the drawing and does not imply, in particular, that the first X-ray source SRC.1 and the second X-ray source SRC.2 have different spacings from the examination volume VOL or from the center of rotation during the recording of the first X-ray projections XP.1 and the second X-ray projections XP.2.

Figure 8:
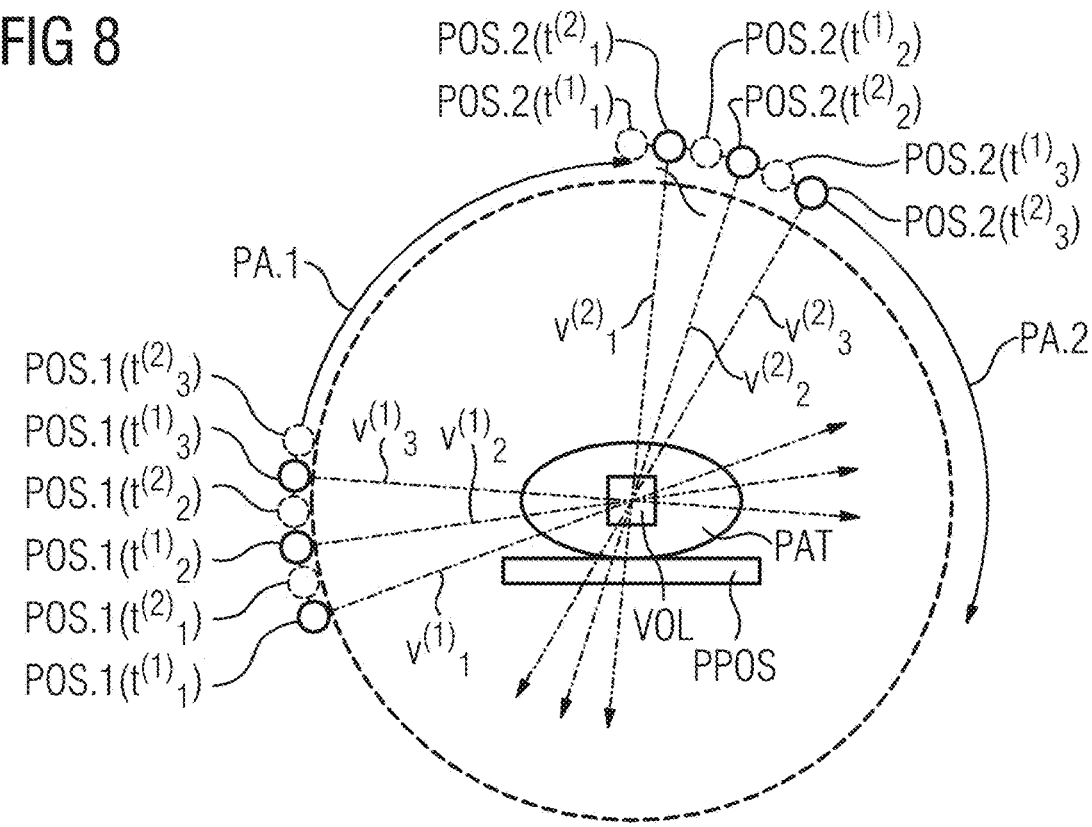
FIG. 8 shows possible positions of X-ray sources for the first example embodiment of a first projection angle region and a second projection angle region.

FIG. 8 shows possible positions POS.1($t^{(1)}_1$), . . . , POS.2($t^{(2)}_3$) of X-ray sources SRC.1, SRC.2 for the first example embodiment shown in FIG. 7 of a first projection angle region PA.1 and a second projection angle region PA.2.

Herein, POS.1($t$) denotes the position of a first X-ray source SRC.1 at the time point t, and POS.2($t$) denotes the position of a second X-ray source SRC.2 at the time point t. Herein, the first X-ray source SRC.1 and the second X-ray source SRC.2 differ and the first X-ray source SRC.1 records first X-ray projections XP.1 in respect of a first X-ray energy $E_1$, and the second X-ray source SRC.2 records second X-ray projections XP.2 in respect of a second X-ray energy $E_2$.

In the example embodiment shown, the i-th X-ray projection of the first X-ray projections XP.1 is recorded at the time point $t^{(1)}_3$, wherein $t^{(1)}_i < t^{(1)}_3$ for i≤j. Furthermore, in the example embodiment shown, the i-th X-ray projection of the second X-ray projections XP.2 is recorded at the time point $t^{(2)}_i$, wherein $t^{(2)}_i < t^{(2)}_j$ for i≤j. Furthermore, in the example embodiment shown $t^{(1)}_i < t^{(2)}_i < t^{(1)}_{i+1}$ applies, alternatively however, other temporal sequences of the first and the second X-ray projections XP.1, XP.2 can be used. The time points $t^{(1)}_i$ can, in particular, be contained within the first X-ray projections XP.1, in particular as metadata, furthermore, the time points $t^{(2)}_i$ can be contained, in particular, in the second X-ray projections XP.2.

At one of the positions POS.1($t^{(1)}_i$) (mapped in FIG. 8 are the positions POS($t^{(1)}_1$), POS($t^{(1)}_2$), POS($t^{(1)}_3$) of the first X-ray source SRC.1 at the time point $t^{(1)}_i$ (here $t^{(1)}_1$, $t^{(1)}_2$, $t^{(1)}_3$), the first X-ray source SRC.1 records one of the first X-ray projections XP.1 in respect of the first X-ray energy $E_1$ in respect of a projection direction $v^{(1)}_i$ (here $v^{(1)}_1$, $v^{(1)}_2$, $v^{(1)}_3$. At the positions POS.1($t^{(2)}_i$) (shown in FIG. 8 are the positions POS($t^{(2)}_1$), POS($t^{(2)}_2$), POS($t^{(2)}_3$)) of the first X-ray source SRC.1 at the time point $t^{(2)}_i$ (here $t^{(2)}_1$, $t^{(2)}_2$, $t^{(2)}_3$), the first X-ray source SRC.1 does not in general record any X-ray projection (except in the case $t^{(1)}_i = t^{(2)}_j$ for a pair i, j). At one of the positions POS.2($t^{(2)}_i$) (shown in FIG. 8 are the positions POS.2($t^{(2)}_1$), POS.2($t^{(2)}_2$), POS($t^{(2)}_3$)) of the second X-ray source SRC.2 at the time point $t^{(2)}_i$ (here $t^{(2)}_1$, $t^{(2)}_2$, $t^{(w)}_3$), the second X-ray source SRC.2 records one of the second X-ray projections XP.2 in respect of the second X-ray energy $E_2$ in respect of a projection direction $v^{(2)}_i$ (here $v^{(2)}_1$, $v^{(2)}_2$, $v^{(2)}_3$). At the positions POS.2($t^{(1)}_i$) (shown in FIG. 8 are the positions POS.2($t^{(1)}_1$), POS.2($t^{(1)}_2$), POS.2($t^{(1)}_3$)) of the second X-ray source SRC.2 at the time point $t^{(1)}_i$ (here $t^{(1)}_1$, $t^{(1)}_2$, $t^{(1)}_3$), the second X-ray source SRC.2 does not in general record any X-ray projection (except in the case $t^{(1)}_i = t^{(2)}_j$ for a pair i, j).

In FIG. 8, for reasons of clarity, only the positions of the first X-ray source SRC.1 and the second X-ray source SRC.2 are shown for three X-ray projections XP.1, XP.2. In general, significantly more first X-ray projections XP.1, XP.2 are used and the positions of the first X-ray detector DTC.1 and of the second X-ray detector DTC.2 are situated along the projection direction $v^{(1)}_1$, $v^{(1)}_2$, $v^{(1)}_3$, $v^{(2)}_1$, $v^{(2)}_2$, $v^{(2)}_3$ on the side of the examination volume VOL opposite the first or second X-ray source SRC.1, SRC.2.

In FIG. 8, the first projection angle region PA.1 and the second projection angle region PA.2 are shown with different radii, and accordingly, the positions POS.1($t^{(1)}_1$), . . . , POS.2($t^{(2)}_3$)) have different spacings from the examination volume VOL. The different radius or the different spacings were selected, in particular, for reasons of the clarity of the drawing and do not imply, in particular, that the first X-ray source SRC.1 and the second X-ray source SRC.2 have different spacings from the examination volume VOL or from the center of rotation during the recording of the first X-ray projections XP.1 and the second X-ray projections XP.2.

Figure 9:
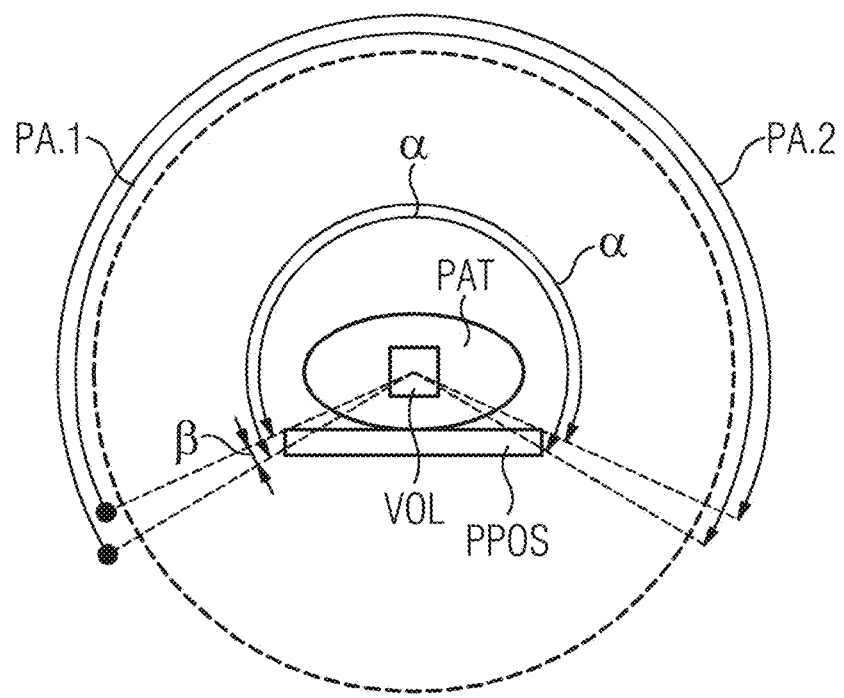
FIG. 9 shows a second example embodiment of a first projection angle region and a second projection angle region.

FIG. 9 shows a second example embodiment of a first projection angle region PA.1 and a second projection angle region PA.2. The projection angle regions PA.1, PA.2 shown can be used, in particular, for recording first X-ray projections XP.1 and/or second X-ray projections XP.2 upon which a first real image data record RD.1 and/or a second real image data record RD.2 and/or a multienergetic real image data record RD.M are based. The significance of the projection angle regions PA.1, PA.2 for the positions of the first X-ray source SRC.1, of the first X-ray detector DTC.1, of the second X-ray source SRC.2 and of the second X-ray detector DTC.2 corresponds to the significance described in relation to FIG. 7.

In the second example embodiment shown, the first projection angle region PA.1 can also be identified with a circular rotation of the first X-ray source SRC.1 around the examination volume VOL, wherein the first X-ray source SRC.1 describes a circular arc with an angle α+β. Furthermore, in particular, the second projection angle region PA.2 can be identified with a circular rotation of the second X-ray source SRC.2 around the examination volume VOL, wherein the second X-ray source SRC.2 also describes a circular arc with an angle α+β. Alternatively to the circular rotations and arcs, elliptical rotations or elliptical arcs or other at least partially concave movements of the first or the second X-ray source SRC.1, SRC.2 are possible. The angle α is herein, in particular, greater than 180°, in particular, the angle α corresponds to the sum of 180° and the aperture angle of the X-ray radiation emerging from the first or second X-ray source SRC.1, SRC.2. In particular, therefore, in this example embodiment, the angle α corresponds to 200°. The angle β can correspond, in particular, to the minimum angle between the direction of the first X-ray source SRC.1 to the first X-ray detector DTC.1 and the direction of the second X-ray source SRC.2 to the second X-ray detector SRC.2. The angle β is thus constrained downwardly, in particular, by the extent and the geometrical form of the X-ray sources SRC.1, SRC.2 and the X-ray detectors DTC.1, DTC.2.

Figure 10:
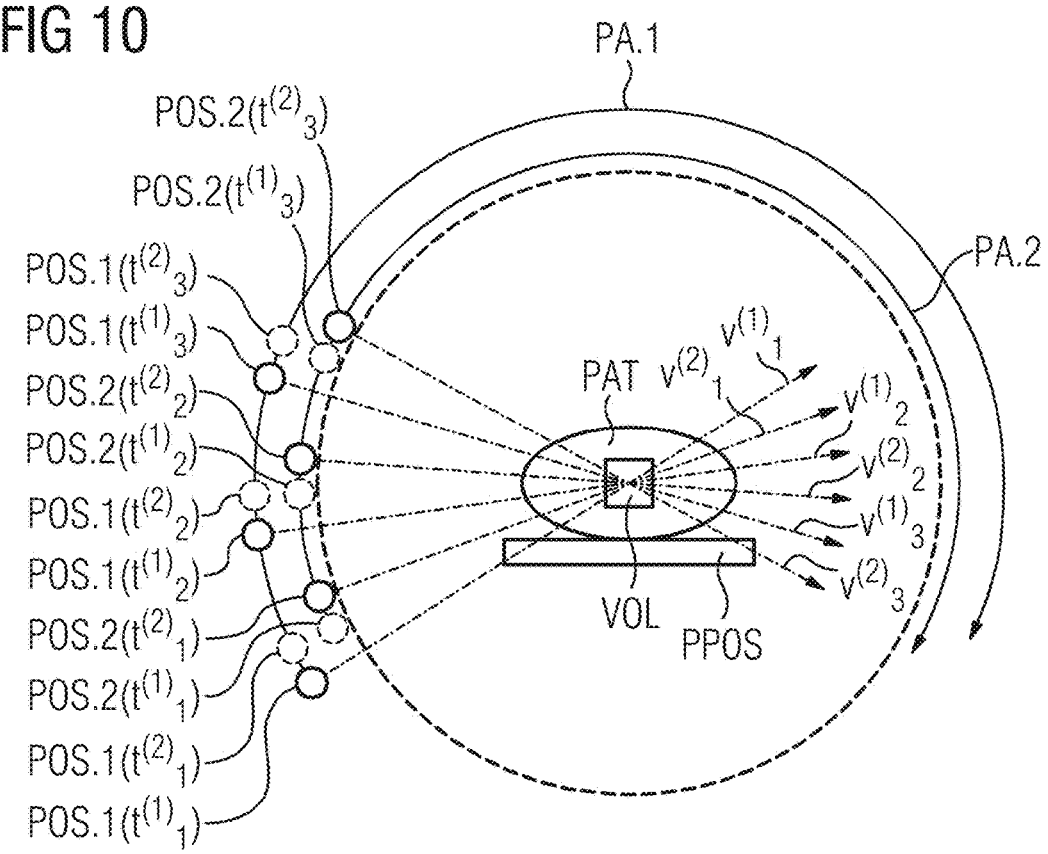
FIG. 10 shows possible positions of X-ray sources for the second example embodiment of a first projection angle region and a second projection angle region.

FIG. 10 shows possible positions POS.1($t^{(1)}_1$), . . . , POS.2($t^{(2)}_3$) of X-ray sources SRC.1, SRC.2 for the second example embodiment shown in FIG. 9 of a first projection angle region PA.1 and a second projection angle region PA.2. With regard to the objects shown, reference is made to the description in relation to FIG. 8.

In the second example embodiment shown, the first X-ray detector DTC.1 and the second X-ray detector DTC.2 have a constant, in particular, a minimum spacing, and/or the first X-ray source SRC.1 and the second X-ray source SRC.2 have a constant, in particular, a minimum spacing.

The projection angle regions PA.1, PA.2 shown in FIG. 9 and the positions shown in FIG. 10 can also serve as the basis for the recording with only one X-ray source SRC.1 and only one X-ray detector DTC.1, wherein the one X-ray source SRC.1 can be switched between the first X-ray energy and the second X-ray energy. Herein, the one first X-ray source records first X-ray projections XP.1 at the positions POS.1($t^{(1)}_1$), POS.1($t^{(1)}_2$), POS.1($t^{(1)}_3$) with the first X-ray energy and at the positions POS.2($t^{(2)}_1$), POS.2($t^{(2)}_2$), POS.2($t^{(2)}_3$), second X-ray projections XP.2 with the second X-ray energy. The remaining X-ray projections are irrelevant.

Figure 11:
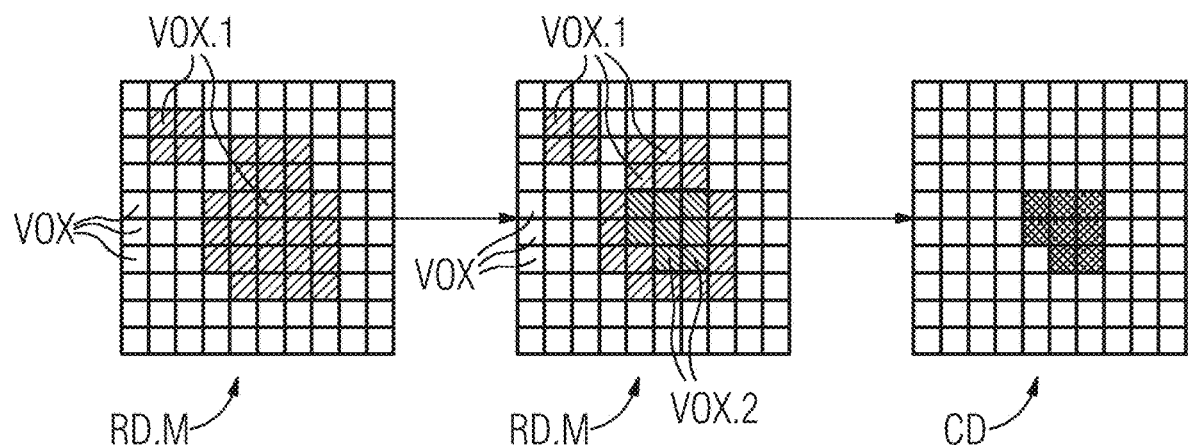
FIG. 11 shows first and second voxels of the multienergetic real image data record and a constraint image data record.

FIG. 11 shows a schematic two-dimensional representation of a multienergetic real image data record RD.M and a schematic two-dimensional representation of a constraint image data record CD. The two-dimensional representations can also be interpreted as a section through a higher-dimensional real image data record RD.M or through a higher-dimensional constraint image data record CD.

The multienergetic real image data record RD.M comprises a set of pixels or voxels VOX. by way of the selection SEL-VOX.1 of the first voxels VOX.1, first voxels VOX.1 are selected from the set of voxels VOX of the multienergetic real image data record RD.M. The first voxels VOX.1 are therefore a subset, in particular, a true subset of the voxels VOX of the multienergetic real image data record RD.M.

By way of the selection SEL-VOX.2 of the second voxels VOX.2, first voxels VOX.2 are selected from the set of first voxels VOX.1. The second voxels VOX.2 are therefore a subset, in particular, a real subset of the first voxels VOX.1.

FIG. 11 also shows a constraint image data record CD. The constraint image data record CD has the same dimensionality as the multienergetic real image data record RD.M and also has, in respect of each dimension, the same extent measured in pixels or voxels as the multienergetic real image data record RD.M. In particular therefore, a bijective depiction or a clear correspondence exists between the voxels VOX of the multienergetic real image data record RD.M and the voxels of the constraint image data record CD.

Figure 12:
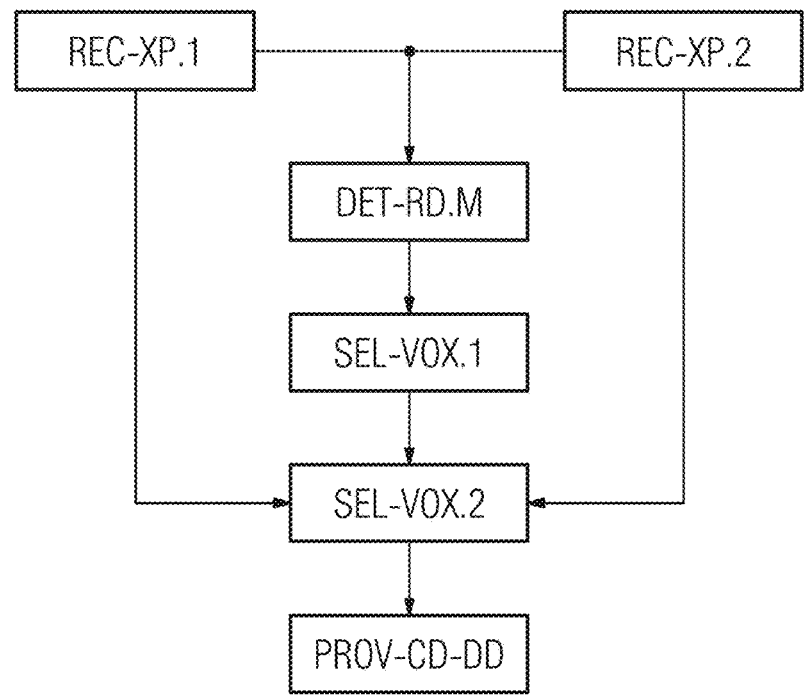
FIG. 12 shows a flow diagram of a first example embodiment of a method for providing a constraint image data record and/or a difference image data record.

FIG. 12 shows a sequence diagram of a first example embodiment of the method for providing a constraint image data record CD and/or a difference image data record DD.

The first steps of the first example embodiment are the receiving REC-XP.1 of first X-ray projections XP.1 of the examination volume VOL in respect of a first X-ray energy E1 via an interface IF, in particular, via the interface IF of a provision system PRVS, and the receiving REC-XP.2 of second X-ray projections XP.2 of the examination volume VOL in respect of a second X-ray energy E2 via the interface IF, in particular, via the interface IF of the provision system PRVS, wherein the second X-ray energy E2 differs from the first X-ray energy E1.

A further step of the example embodiment shown is the determination DET-RD.M of a multienergetic real image data record RD.M of the examination volume VOL based upon the first X-ray projections XP.1 and the second X-ray projections XP.2. In the example embodiment shown, the multienergetic real image data record RD.M is determined via a computer unit CU, in particular the computer unit CU of the provision system, as a three-dimensional reconstruction of the first X-ray projections XP.1 and of the second X-ray projections XP.2.

Alternatively, the multienergetic real image data record RD.M of the examination volume VOL can also be received via the interface IF. In particular, a three-dimensional first real image data record RD.1 based upon the first X-ray projections XP.1 can also be reconstructed and a three-dimensional second real image data record RD.2 based upon the second X-ray projections XP.2 can be reconstructed, and the multienergetic real image data record RD.M is determined based upon the three-dimensional first real image data record RD.1 and the three-dimensional second real image data record RD.2.

A further step of the first example embodiment shown is a selection SEL-VOX.1 of first voxels VOX.1 of the multienergetic real image data record RD.M based upon the multienergetic real image data record RD.M. In particular, in the example embodiment shown, the first voxels VOX.1 are determined by using a trained function TF on the multienergetic real image data record RD.M. The trained function TF herein assigns a probability value, in particular, to each voxel VOX of the multienergetic real image data record RD.M, wherein the probability value corresponds to the probability that the respective voxel VOX maps contrast medium in the examination volume VOL or maps a vessel VES.1, VES.2 in the examination volume VOL. Then as the first voxels VOX.1, the voxels VOX of the multienergetic real image data record RD.M are selected, the respective probability values of which lie above a given threshold value.

A further step of the first example embodiment shown is the selection SEL-VOX.2 of second voxels VOX.2 of the multienergetic real image data record RD.M based upon the first X-ray projections XP.1 and the second X-ray projections XP.2, wherein the first voxels VOX.1 comprise the second voxels VOX.2, and the second voxels VOX.2 map contrast medium in the examination volume VOL. Alternatively, the second voxels VOX.2 can also map a vessel VES.1, VES.2 in the examination volume VOL. In particular, the second voxels VOX.2 are selected from the first voxels VOX.1. In the example embodiment shown, a polyenergetic reconstruction of each of the first voxels VOX.1 takes place based upon the first X-ray projections XP.1 and the second X-ray projections XP.2. In other words, therefore, for each of the first voxels VOX.1, by way of the polyenergetic reconstruction algorithm, it is determined whether this voxel map a contrast medium in the examination volume VOL. If this is the case, then this voxel is selected as one of the second voxels VOX.2.

In the example embodiment shown, in particular, a discrete tomography algorithm and a polyenergetic reconstruction can be combined in order to decide for voxels VOX whether they map contrast medium or other materials (e.g. bone, metal, water) in the examination region. For example, as a discrete tomography algorithm, SDART described in the publication by F. Bleichrodt et al.: "SDART: An algorithm for discrete tomography from noisy projections", Computer Vision and Image Understanding, Vol. 129, pp. 63-74, 2014 can be used, the entire contents of which is hereby incorporated herein by reference and, in the fifth step of the algorithm, the data consistency $\|Wxs-p\|2$ according to the polyenergetic method described by I. A. Elbakri and J. A. Fessler in: "Statistical Image Reconstruction for Polyenergetic X-Ray Computed Tomography", IEEE Transactions on Medical Imaging, Vol. 21, pp. 89-99, 2002 can be used, the entire contents of which is hereby incorporated herein by reference.

The last step of the example embodiment shown is the provision PROV-CD-DD of a constraint image data record CD and/or of a difference image data record DD based upon the second voxels VOX.2. In this example embodiment, a constraint image data record CD is provided which corresponds in its dimension and extent to the multienergetic real image data record RD.M. The difference image data record DD can then optionally be determined as a multiplication or subtraction of the constraint image data record CD and of the multienergetic real image data record RD.M.

Figure 13:
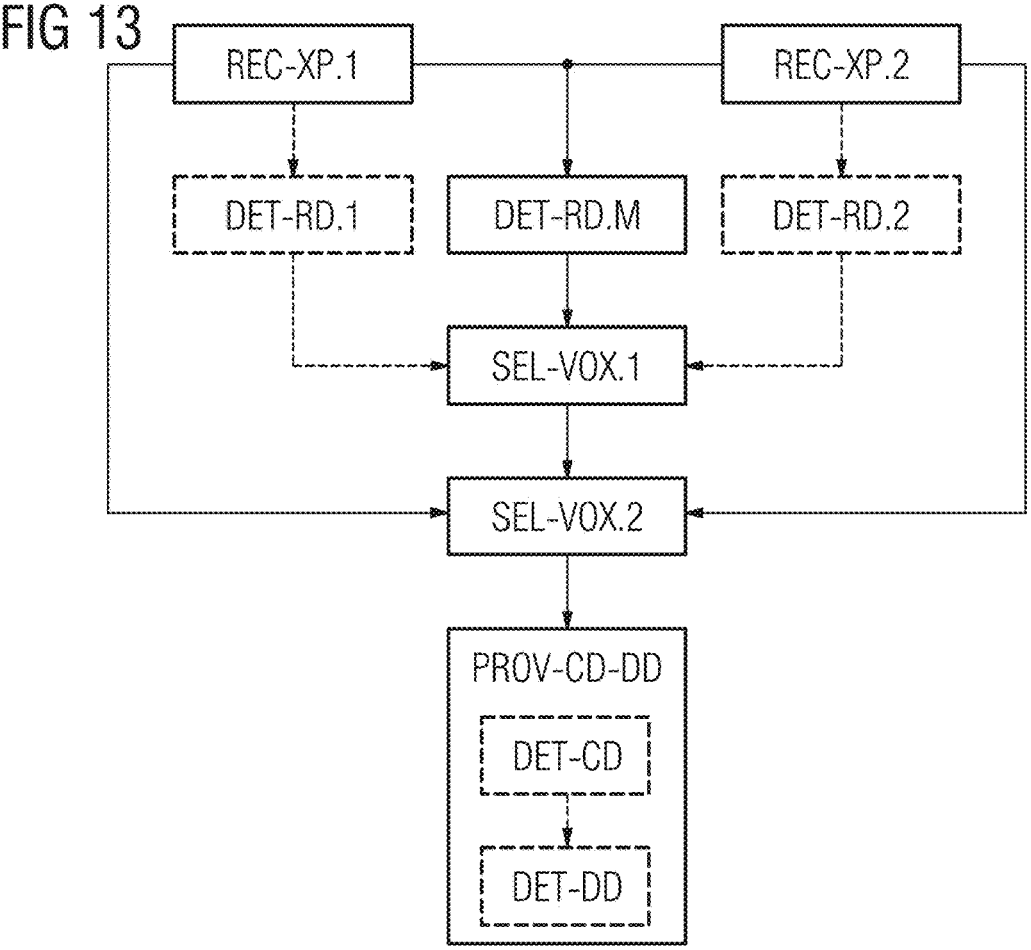
FIG. 13 shows a flow diagram of a second example embodiment of a method for providing a constraint image data record and/or a difference image data record.

FIG. 13 shows a sequence diagram of a second example embodiment of the method for providing a constraint image data record CD and/or a difference image data record DD. It shows a flow diagram of a second example embodiment of the method for providing a difference image data record DD. The second example embodiment follows the data flow shown in FIG. 6.

The first steps of the second example embodiment are the receiving REC-XP.1 of first X-ray projections XP.1 of the examination volume VOL in respect of a first X-ray energy E1 via an interface IF and the receiving REC-XP.2 of second X-ray projections XP.2 of the examination volume VOL in respect of a second X-ray energy E2 via the interface IF, wherein the first X-ray energy E1 differs from the second X-ray energy E2.

Further optional steps of the second example embodiment are the determination DET-RD.1 of a first real image data record RD.1 of the examination volume VOL in respect of the first X-ray energy E1, and the determination DET-RD.2 of the second real image data record RD.2 of the examination volume VOL in respect of the second X-ray energy E2. Herein, the determination DET-RD.1 of the first real image data record RD.1 takes place by way of a three-dimensional reconstruction of the first X-ray projections XP.1 by a computer unit CU, and the determination DET-RD.2 of the second real image data record RD.2 by way of a three-dimensional reconstruction of the second X-ray projections XP.2 by the computer unit CU.

In the example embodiment shown, the three-dimensional reconstruction takes place by way of a filtered back-projection. Alternatively, iterative reconstructions or reconstructions based upon the Feldkamp algorithm are known.

In a mathematical notation, in this second example embodiment, the three-dimensional first real image data record RD.1 is given by $B^{(1)}=R(b^{(1)}_1, \ldots, b^{(1)}_m)$, and the second real image data record RD.2 by $B^{(2)}=R(b^{(2)}_1, \ldots, b^{(2)}_n)$. Herein, R denotes the reconstruction function, $b^{(1)}_i$ denotes the i-th (of the m overall) first X-ray projections XP.1, and $b^{(2)}_i$ denotes the i-th (of the n overall) second X-ray projections XP.2.

A further step of the second example embodiment is the determination DET-RD.M of a multienergetic real image data record RD.M of the examination volume VOL in respect of the first X-ray energy $E_1$ and the second X-ray energy $E_2$ via the computer unit CU. Herein, the determination DET-RD.M of the multienergetic real image data record RD.M takes place by way of a three-dimensional reconstruction of the first X-ray projections XP.1 and the second X-ray projections XP.2. In the example embodiment shown, the three-dimensional reconstruction takes place by way of a filtered back-projection. Alternatively, iterative reconstructions or reconstructions based upon the Feldkamp algorithm are known.

In a mathematical notation, in this second example embodiment, the three-dimensional multienergetic real image data record RD.M is given by $B^{(m)}=R(b^{(1)}_1, \ldots, b^{(1)}_m, b^{(2)}_1, \ldots, b^{(2)}_n)$.

A further step of the second example embodiment shown is the selection SEL-VOX.1 of first voxels VOX.1 of the three-dimensional multienergetic real image data record RD.M. For this purpose, the trained function TF is applied to the three-dimensional first real image data record RD.1, to the three-dimensional second real image data record RD.2 and to the three-dimensional multienergetic real image data record RD.M as input data and generates, as output data, a three-dimensional probability data record. In mathematical notation, this results in $W=f(B^{(1)}, B^{(2)}, B^{(m)})$. This three-dimensional probability data record has, in respect of each of the three dimensions, the same extent measured in voxels as the three-dimensional multienergetic real image data record RD.M, in particular, the three-dimensional probability data record thus assigns a probability value to each of the voxels VOX of the three-dimensional multienergetic real image data record RD.M. In particular, the probability value assigned to a voxel VOX of the three-dimensional multienergetic real image data record RD.M is a measure of the probability that this voxel VOX maps contrast medium in the examination volume VOL or that this voxel VOX maps a vessel VES.1, VES.2 in the examination volume VOL.

The first voxels VOX.1 then correspond to those voxels VOX of the multienergetic real image data record RD.M, the assigned probability value of which lies above a given threshold value.

A further step of the example embodiment shown is the selection of second voxels VOX.2 of the multienergetic real image data record RD.M based upon the first X-ray projections XP.1 and the second X-ray projections XP.2. In the example embodiment shown, for each of the first voxels VOX.1, a polyenergetic reconstruction is carried out by way of SDART in order to make a selection of the second voxels VOX.2.

The last step of the example embodiment shown is the provision PROV-CD-DD of the constraint image data record CD and/or of the difference image data record DD. This step comprises the optional steps of the determination DET-CD of the constraint image data record CD and the determination of the difference image data record DD.

In this example embodiment, the determination DET-CD of the constraint image data record CD takes place in that as the constraint image data record CD, an image data record of the same dimension and the same extent as the multienergetic real image data record RD.M is defined, wherein for the values $C_{ijk}$ of the constraint image data record CD, $C_{ijk}=1$ applies if the indices i, j and k describe a voxel of the second voxels VOX.2, and $C_{ijk}=0$ if the indices i, j and k do not describe any voxel of the second voxels VOX.2.

The determination DET-DD of the difference image data record DD then takes place in particular in that the constraint image data record CD is multiplied voxel-wise by the multienergetic real image data record RD.M. In particular, for the values $D_{ijk}$ of the difference image data record $D_{ijk}=B_{ijk} \cdot C_{ijk}$ applies.

Figure 14:
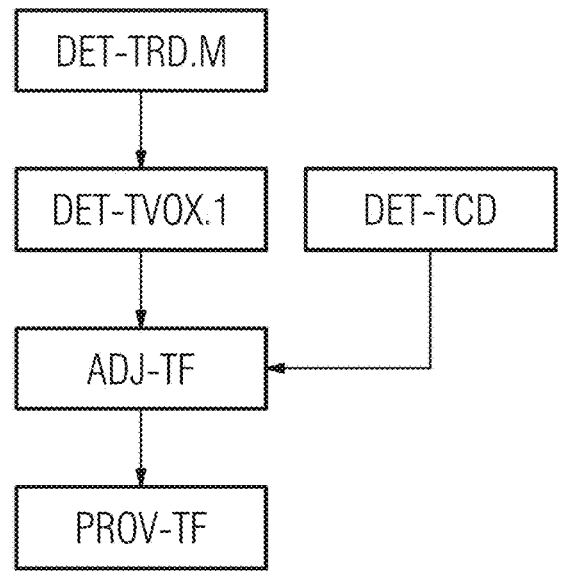
FIG. 14 shows a flow diagram of a first example embodiment of a method for providing a trained function.

FIG. 14 shows a sequence diagram of a first example embodiment of a method for providing a trained function TF.

The first step of the first example embodiment shown is the determination DET-TRD.M of a multienergetic training real image data record of a training examination volume in respect of a first training X-ray energy and a second training X-ray energy, wherein the second training X-ray energy differs from the first training X-ray energy. In this example embodiment, the multienergetic training real image data record is received via a training interface TIF of a training system TRS.

Alternatively, first training X-ray projections of the training examination volume in respect of a first training X-ray energy and second training X-ray projections of the training examination volume in respect of a second training X-ray energy can also be received (in particular via the training interface TIF), and the multienergetic training real image data record can be determined by way of three-dimensional reconstruction of the first training X-ray projections and the second training X-ray projections via a computer unit TCU of the training system TRS.

A further step of the example embodiment shown is the determination DET-TCD of a training constraint image data record of the training examination volume, in particular via the computer unit TCU of the training system TRS. In this example embodiment, the training constraint image data record is determined by way of a polyenergetic reconstruction, in particular with SDART, in particular combined with a discrete tomography algorithm, based upon the first training X-ray projections and the second training X-ray projections. In particular, the training constraint image data record has the same dimensionality and the same extent of the multienergetic training real image data record.

A further step of the example embodiment shown is the determination DET-TVOX.1 of first training voxels of the training real image data record by applying the trained function TF to the training real image data record. In particular, the trained function TF can assign to each voxel of the multienergetic training real image data record a probability value, and the first training voxels correspond to the voxels, the assigned probability value of which lies above a threshold value.

A further step of the example embodiment shown is the adaptation ADJ-TF of the trained function TF based upon a comparison of the first training voxels and the training constraint image data record. In this example embodiment, the trained function TF is, in particular, an artificial neural network, in particular a convolutional artificial neural network. The adaptation ADJ-TF of the trained function TF takes place, in particular, in that the edge weights of the neural network are adapted by way of the backpropagation algorithm such that a cost function is minimized. The cost function can be based, in particular, on the number of faulty first training voxels, for example, as $K=\Sigma_{ijk} (\Theta(TF(B^{(m)})_{ijk}-s)-C_{ijk})^2$, wherein $B^{(m)}$ denotes the multienergetic training real image data record, $TF(B^{(m)})$ denotes the result of the application of the trained function TF to the multienergetic training real image data record, $\Theta$ denotes the Heaviside step function, s the threshold value and C the training constraint image data record. Alternatively, the cost function can also be based upon a direct comparison of the output data of the trained function (for example, the probability values) and the training constraint image data record, for example as $K=\Sigma_{ijk} (TF(B^{(m)})_{ijk}-C_{ijk})^2$.

The last step of the example embodiment shown is the provision PROV-TF of the trained function TF via the training interface TIF of the training system TRS. The provision PROV-TF can comprise, in particular, an output of the trained function TF, a storage of the trained function TF and/or a transfer of the trained function TF.

Figure 15:
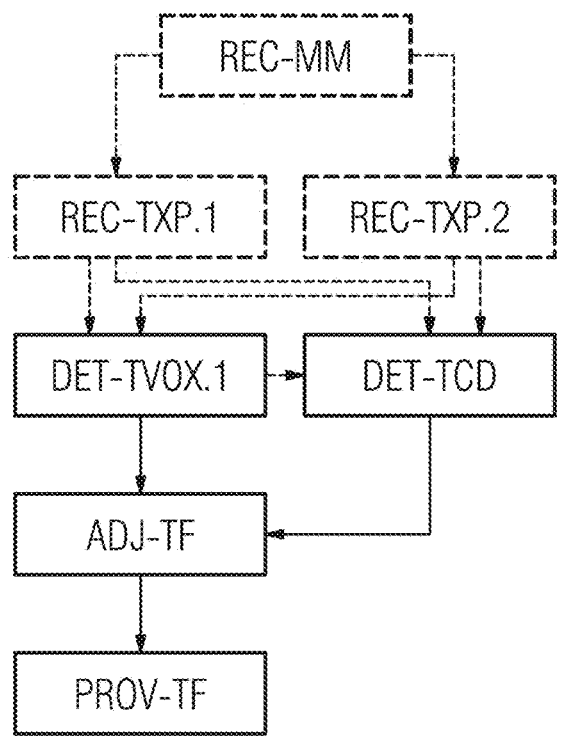
FIG. 15 shows a flow diagram of a second example embodiment of a method for providing a trained function.

FIG. 15 shows a sequence diagram of a second example embodiment of a method for providing a trained function TF. The second example embodiment has all the steps of the first example embodiment shown in FIG. 14, and can, in particular, also have the advantageous configurations and developments described there.

The example embodiment shown further comprises the receiving DET-MM of a three-dimensional material model of the training examination volume, in particular via the training interface TIF. Herein, the three-dimensional material model is a material model of the training examination volume comprising contrast medium.

A material model describes, in this second example embodiment, a three-dimensional spatial distribution of an energy-dependent X-ray absorption coefficient µ(x, E). In this example embodiment, the material model is continuous, i.e. a function of the three-dimensional spatial coordinates x, in particular, a constant function or in particular, a differentiable function of the spatial coordinate x. Alternatively, the material model can also be spatially discrete, i.e. comprise a quantity of voxels to each of which an energy-dependent X-ray absorption coefficient µ(E) is assigned. In particular, with a regular arrangement of the voxels, the material model can be described by way of an indexed energy-dependent X-ray absorption coefficient $\mu_{ijk}(E)$. The material model can further be defined for an arbitrary number of X-ray energies E, but it is sufficient to give the material model only for the first and second training X-ray energy, that is $\mu^{(1)}(x)$ and/or $\mu^{(1)}_{ijk}$ for the first training X-ray energy and $\mu^{(2)}(x)$ or $\mu^{(2)}_{ijk}$ for the second training X-ray energy.

The second example embodiment shown further comprises the receiving REC-TXP.1 of first training X-ray projections of the examination volume and the receiving REC.TXP.2 of second training X-ray projections of the examination volume via the training interface TIF of the training system TRS. Herein, the first training X-ray projections are X-ray projections of the training examination volume in respect of the first training energy, and the second training X-ray projections are X-ray projections of the training examination volume in respect of the second training energy.

The receiving REC-TXP.1 of the first training X-ray projections and the receiving REC-TXP.2 of the second training X-ray projections can also take place in that the first training X-ray projections and the second training X-ray projections are determined based upon the material model, in particular, through simulation of the interaction of X-ray radiation of the respective training X-ray energy with the material model. The training X-ray projections are given in this case by the equation $$b^{(1/2)}(y,v) \propto \int_{\Gamma(y,v)} \mu^{(1/2)}(x) dx$$

wherein $\Gamma(y, v)$ is the path from the X-ray source to the X-ray detector at the coordinate y if the projection direction corresponds to the angle v. In particular, in this case, the first material model can also be formed as temporally changeable in order to simulate a temporally changeable density of contrast medium in the training examination volume.

In the second example embodiment, the determination DET-TRD.M of the multienergetic training real image data record takes place by way of a reconstruction of the first training X-ray projections and of the second training X-ray projections. This reconstruction takes place, in particular, without taking account of the different training X-ray energies. The determination DET-TCD of the training constraint image data record takes place by way of a combination of a discrete tomography algorithm and a polyenergetic reconstruction based upon the first training X-ray projections and the second training X-ray projections. An optional first training X-ray real image data record can be reconstructed based upon the first training X-ray projections, and an optional second training real image data record can be reconstructed based upon the second training X-ray projections.

For example, the optional first training real image data record and the second training real image data record are each three-dimensional image data records of the training examination volume, comprising 256·256·256 voxels, and the multienergetic training real image data record is a three-dimensional record of the examination volume comprising 512·512·512 voxels, and the first material model also comprises 512·512·512 voxels. Alternatively to the reconstruction based upon the training X-ray projection, the first training real image data record and the second training real image data record can be calculated from $B_{ijk}^{(1/2)} = \sum_{i'=2i}^{2i+1} \sum_{j'=2j}^{2j+1} \sum_{k'=2k}^{2k+1} \mu_{i'j'k'}^{(1/2)}$ based upon the material model, and the multienergetic training real image data record can be calculated from $B_{ijk}^{(m)} = (\mu_{ijk}^{(1)} + \mu_{ijk}^{(2)})/2$ based upon the material model.

In particular, it is also possible that the training constraint image data record is also derived from the material model. This can take place based upon the individual attenuation coefficients of the material model, or by way of additional knowledge regarding the structures OS.1, OS.2 that are represented by the material model.

Figure 16:
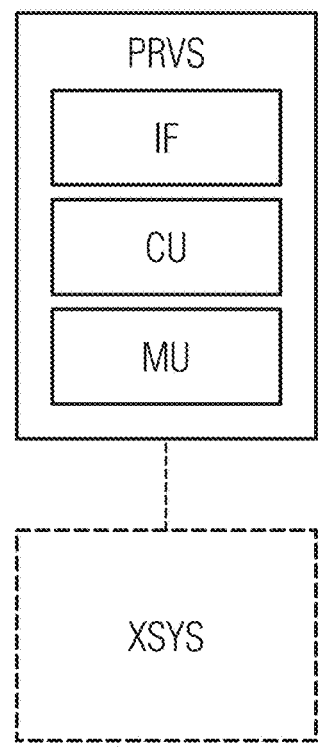
FIG. 16 shows an example embodiment of a provision system.
Figure 17:
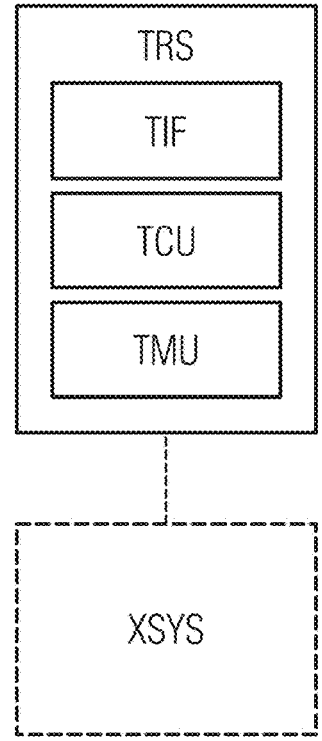
FIG. 17 shows an example embodiment of a training system.

FIG. 16 shows a provision system PRVS and FIG. 17 shows a training system TRS. The provision system PRVS shown is configured to carry out an inventive method for providing a difference image data record DD. The training system TRS shown is configured to carry out an inventive method for providing a trained function TF. The provision system PRVS comprises an interface IF, a computer unit CU and a memory unit MU, the training system TRS comprises a training interface TIF, a training computer unit TCU and a training memory unit TMU.

The provision system PRVS and/or the training system TRS can be, in particular, a computer, a microcontroller or an integrated circuit. Alternatively, the provision system PRVS and/or the training system TRS can be a real or virtual grouping of computers (a technical term therefor being "cluster" or, in the case of a virtual grouping, "cloud"). The provision system PRVS and/or the training system TRS can also be configured as a virtual system which is executed on a real computer or a real or virtual grouping of computers (a technical term therefor being "virtualization").

An interface IF and/or a training interface TIF can be a hardware or software interface (for example, PCI bus, USB or Firewire). A computer unit CU and/or a training computer unit TCU can comprise hardware elements or software elements, for example, a microprocessor or a so-called FPGA (Field Programmable Gate Array). A memory unit MU and/or a training memory unit MTU can be realized as a non-permanent working memory (Random Access Memory, RAM) or as a permanent mass storage device (hard disk, USB stick, SD card, solid state disk).

The interface IF and/or the training interface TIF can comprise, in particular, a plurality of subsidiary interfaces which carry out the different steps of the respective method. In other words, the interface IF and/or the training interface TIF can also be regarded as a plurality of interfaces IF or a plurality of training interfaces TIF. The computer unit CU and/or the training computer unit TCU can comprise, in particular, a plurality of subsidiary computer units which carry out the different steps of the respective method. In other words, the computer unit CU and/or the training computer unit TCU can also be regarded as a plurality of computer units CU or a plurality of training computer units TCU.

Figure 18:
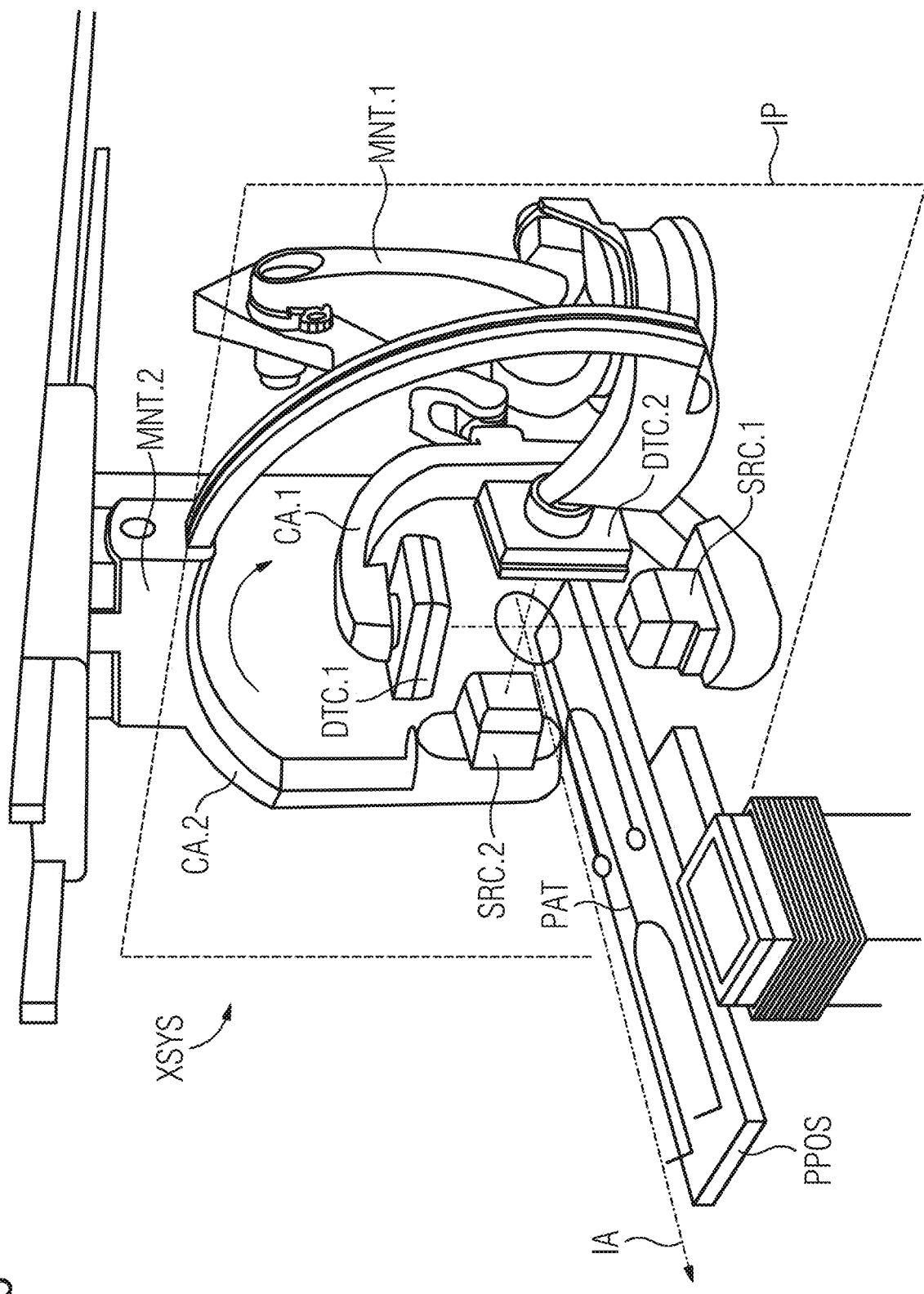
FIG. 18 shows an X-ray device.

FIG. 18 shows an example embodiment of an X-ray device XSYS. The X-ray device XSYS is herein configured as a double C-arm X-ray device. The X-ray device comprises a first C-arm CA.1 and arranged at the first end of the first C-arm CA.1 is a first X-ray source SRC.1, and at the second end of the first C-arm CA.1 is a first X-ray detector DTC.2. The X-ray device further comprises a second C-arm CA.2 and arranged at the first end of the first C-arm CA.2 is a second X-ray source SRC.2, and arranged at the second end of the second C-arm CA.2 is a second X-ray detector. The first C-arm CA.1 is arranged on a first mounting MNT.1, wherein the first mounting is configured as a multiaxis articulated robot. The second C-arm CA.2 is arranged on a second mounting MNT.2, wherein the second mounting comprises a ceiling fixing.

The first X-ray source SRC.1 and the second X-ray source SRC.2 are, in particular, an X-ray tube having, in particular, the same anode material. The first X-ray detector DTC.1 and the second X-ray detector are, in particular, flat panel detectors.

The X-ray sources SRC.1, SRC.2 and the X-ray detectors DTC.1, DTC.2 are herein configured for rotation about an imaging axis IA, in particular for circular rotation about the imaging axis IA. The imaging axis IA herein intersects, in particular, the examination volume VOL. On rotation about the imaging axis, the X-ray sources SRC.1, SRC.2 and the X-ray detectors move in an imaging plane IP, wherein the imaging plane IP is arranged orthogonal to the imaging axis IA. The X-ray sources SRC.1, SRC.2 and the X-ray detectors DTC.1, DTC.2 are configured to rotate about the imaging axis IA, in that the C-arms CA.1, CA.2 are configured to rotate about the imaging axis IA.

The X-ray device XSYS further comprises a patient positioning apparatus PPOS, wherein the patient positioning apparatus PPOS is configured for positioning a patient PAT. In particular, the patient PAT can be displaced via the patient positioning apparatus along the imaging axis IA.

Where it has not yet explicitly been set out, although useful and in the spirit of the invention, individual example embodiments, individual sub-aspects or features thereof can be combined or exchanged with one another without departing from the scope of the present invention. Advantages of the invention described in relation to an example embodiment also apply without explicit mention, where transferable, to other example embodiments.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for providing at least one of a constraint image data record and a difference image data record, the computer-implemented method comprising:
   receiving first X-ray projections of an examination volume in respect of a first X-ray energy;
   receiving second X-ray projections of the examination volume in respect of a second X-ray energy, the second X-ray energy differing from the first X-ray energy;
   determining a multienergetic real image data record of the examination volume based upon the first X-ray projections received and the second X-ray projections received;
   selecting first voxels of the multienergetic real image data record, based upon the multienergetic real image data record determined;
   selecting second voxels of the multienergetic real image data record from the selected first voxels, the selecting being based upon the first X-ray projections received and the second X-ray projections received, the first voxels including the second voxels, and the second voxels being selected so that the second voxels are mapping contrast medium in the examination volume; and
   generating the at least one of the constraint image data record and the difference image data record based upon the second voxels selected, wherein a first value is assigned to a voxel of the constraint image data record corresponding to one of the second voxels of the multienergetic real image data record, and wherein a second value is assigned to a voxel of the constraint image data record not corresponding to one of the second voxels of the multienergetic real image data record.

2. The method of claim 1, wherein the selecting of the second voxels is based upon a discrete tomography algorithm which reconstructs an at least three-dimensional discrete data record from a plurality of two-dimensional projections of the at least three-dimensional data record, wherein the discrete tomography algorithm is selected from the group of a Discrete Algebraic Reconstruction Algorithm, a Soft Discrete Algebraic Reconstruction Algorithm, a greedy algorithm and a Monte Carlo algorithm.

3. The method of claim 2, wherein the selecting of the second voxels is based upon a polyenergetic reconstruction algorithm.

4. The method of claim 3, wherein the polyenergetic reconstruction algorithm classifies voxels as contrast medium voxels or as metal voxels, wherein a contrast medium voxel maps contrast medium in the examination volume, and wherein a metal voxel maps metal in the examination volume.

5. The method of claim 1, wherein the selecting of the second voxels is based upon a polyenergetic reconstruction algorithm that takes into account non-linear energy-dependent X-ray attenuation of a material.

6. The method of claim 5, wherein the polyenergetic reconstruction algorithm classifies voxels as contrast medium voxels or as metal voxels, wherein a contrast medium voxel maps contrast medium in the examination volume, and wherein a metal voxel maps metal in the examination volume.

7. The method of claim 1, wherein the selecting of the first voxel is based upon an application of a trained function to the multienergetic real image data record.

8. The method as claimed in claim 7, wherein the trained function assigns a probability value to a voxel of the multienergetic real image data record, and wherein a probability value of a voxel corresponds to a probability that the voxel maps contrast medium.

9. The method as claimed in claim 8, wherein the selecting of the first voxels is based upon a comparison of a probability value of voxels with a threshold value.

10. The method of claim 1, wherein the determining of the multienergetic real image data record includes an at least three-dimensional reconstruction of the first X-ray projections and the second X-ray projections.

11. The method of claim 1, wherein at least one of:
    during the recording of the first X-ray projections, the examination volume includes contrast medium and,
    during the recording of the second X-ray projections, the examination volume includes contrast medium.

12. The method of claim 1, wherein the first X-ray projections and the second X-ray projections have been recorded simultaneously.

13. The method of claim 1, wherein the first X-ray projections are recordings of a first X-ray source and are recordings of a first X-ray detector, and wherein the second X-ray projections are recordings of a second X-ray source and are recordings of a second X-ray detector.

14. The method of claim 13, wherein a biplanar X-ray device includes the first X-ray source, the second X-ray source, the first X-ray detector and the second X-ray detector.

15. The method of claim 1, wherein each of the first X-ray projections is an X-ray projection of the examination volume in respect of a projection direction from a first projection angle region, wherein each of the second X-ray projections is an X-ray projection of the examination volume in respect of a projection direction from a second projection angle region, and wherein the first projection angle region and the second projection angle region differ from one another.

16. The method of claim 15, wherein the first projection angle region and the second projection angle region are disjoint.

17. A non-transitory computer program product storing a computer program, directly loadable into a training memory of a training system, including program portions to carry out the method of claim 16 when the program portions are executed by the training system.

18. A non-transitory computer-readable storage medium storing program portions, readable and executable by a training system, to carry out the method of claim 16 when the program portions are executed by the training system.

19. The method of claim 15, wherein an overlap of the first projection angle region and the second projection angle region comprises at least 50% of at least one of the first projection angle region and the second projection angle region.

20. The method of claim 19, wherein an overlap of the first projection angle region and the second projection angle region comprises at least 75% of at least one of the first projection angle region and the second projection angle region.

21. The method of claim 20, wherein an overlap of the first projection angle region and the second projection angle region comprises at least 90% of at least one of the first projection angle region and the second projection angle region.

22. A non-transitory computer program product storing a computer program, directly loadable into a memory of a provision system, including program portions to carry out the method of claim 1 when the program portions are executed by the provision system.

23. A non-transitory computer-readable storage medium storing program portions, readable and executable by a provision system, to carry out the method of claim 1 when the program portions are executed by the provision system.

24. A provision system for providing at least one of a constraint image data record and a difference image data record, comprising:
   an interface, the interface being configured to receive first X-ray projections of an examination volume in respect of a first X-ray energy and being configured to receive second X-ray projections of the examination volume in respect of a second X-ray energy, the second X-ray energy differing from the first X-ray energy; and
   a computer unit, at least one of the interface and the computer unit being configured to determine a multienergetic real image data record of the examination volume based upon the first X-ray projections received and the second X-ray projections received,
   the computer unit being configured to select first voxels of the multienergetic real image data record based upon the multienergetic real image data record determined, and being configured to select second voxels of the multienergetic real image data record from the selected first voxels based upon the first X-ray projections received and the second X-ray projections received, the first voxels including the second voxels and the second voxels mapping contrast medium in the examination volume, and
   at least one of the interface and the computer unit being configured to generate at least one of the constraint image data record and the difference image data record based upon the second voxels selected, wherein a first value is assigned to a voxel of the constraint image data record corresponding to one of the second voxels of the multienergetic real image data record, and wherein a second value is assigned to a voxel of the constraint image data record not corresponding to one of the second voxels of the multienergetic real image data record.

25. An X-ray device comprising the provision system of claim 24.

* * * * *